March 13, 1951 E. W. SCHULZ 2,544,730
ELECTRIC RATTRAP
Filed Nov. 22, 1947 12 Sheets-Sheet 1

INVENTOR.
Edward W. Schulz
BY
Frank Keifer
atty.

March 13, 1951  E. W. SCHULZ  2,544,730
ELECTRIC RATTRAP
Filed Nov. 22, 1947  12 Sheets-Sheet 2

INVENTOR.
Edward W. Schulz
BY

March 13, 1951  E. W. SCHULZ  2,544,730
ELECTRIC RATTRAP

Filed Nov. 22, 1947  12 Sheets-Sheet 3

INVENTOR.
Edward W. Schulz
BY
Frank Keiper
atty

March 13, 1951 E. W. SCHULZ 2,544,730
ELECTRIC RATTRAP
Filed Nov. 22, 1947 12 Sheets-Sheet 4

INVENTOR.
Edward W. Schulz
BY
Frank Keiper
atty

March 13, 1951     E. W. SCHULZ     2,544,730
ELECTRIC RATTRAP

Filed Nov. 22, 1947     12 Sheets-Sheet 5

INVENTOR.
Edward W. Schulz
BY
Frank Keifer atty

March 13, 1951 E. W. SCHULZ 2,544,730
ELECTRIC RATTRAP
Filed Nov. 22, 1947 12 Sheets-Sheet 7

INVENTOR.
Edward W. Schulz
BY
Frank Keifer
atty.

March 13, 1951     E. W. SCHULZ     2,544,730
ELECTRIC RATTRAP

Filed Nov. 22, 1947     12 Sheets-Sheet 9

INVENTOR.
Edward W. Schulz
BY
Frank Keifer
atty.

March 13, 1951 E. W. SCHULZ 2,544,730
ELECTRIC RATTRAP
Filed Nov. 22, 1947 12 Sheets-Sheet 11

INVENTOR.
Edward W. Schulz
BY
Frank Keifer
atty

March 13, 1951  E. W. SCHULZ  2,544,730
ELECTRIC RATTRAP

Filed Nov. 22, 1947  12 Sheets-Sheet 12

Edward W. Schulz  INVENTOR.
BY
Frank Keifer
atty

Patented Mar. 13, 1951

2,544,730

UNITED STATES PATENT OFFICE 2,544,730

ELECTRIC RATTRAP

Edward W. Schulz, Rochester, N. Y., assignor to Frank Keiper, Rochester, N. Y.; Elizabeth P. Keiper executrix of said Frank Keiper, deceased Application November 22, 1947, Serial No. 787,547

5 Claims. (Cl. 43—99)

Rats are a nuisance and various kinds of traps have been invented heretofore for the purpose of catching them. The object of this invention is to provide a trap that will catch and kill the rats.

Another object of the invention is to catch and kill the rats by a trap which is operated by electricity.

Another object of the invention is to provide a trap that can be operated either by a storage battery having 6 volts D. C. or by current of 110 volts D. C. or 110 volts A. C. 25 cycle or 60 cycle.

Another object of the invention is to provide the trap with a rotary switch capable of occupying three positions in one of which the trap will be operated (1) by 6 volts D. C. or (2) 110 volts D. C., and 110 volts A. C., 25 cycle, or (3) 110 volts A. C., 60 cycle.

Another object of the invention is to provide the trap with doors which will close in a predetermined sequence after the animal has entered the trap and set it in motion and as the animal makes progress thru the trap.

Another object of the invention is to start the operation of the trap by a so called wave wall unit which has two circuits which are normally balanced in frequency but which are unbalanced by the presence of an animal, with means for amplifying the excess frequency in the one circuit to energize another circuit that will start the mechanism of the trap in motion.

These and other objects of the invention will be illustrated in the drawings, described in the specification and pointed out in the claims at the end thereof.

Figure 10a is a part of and is to be read in connection with Figure 10.

Figure 1:
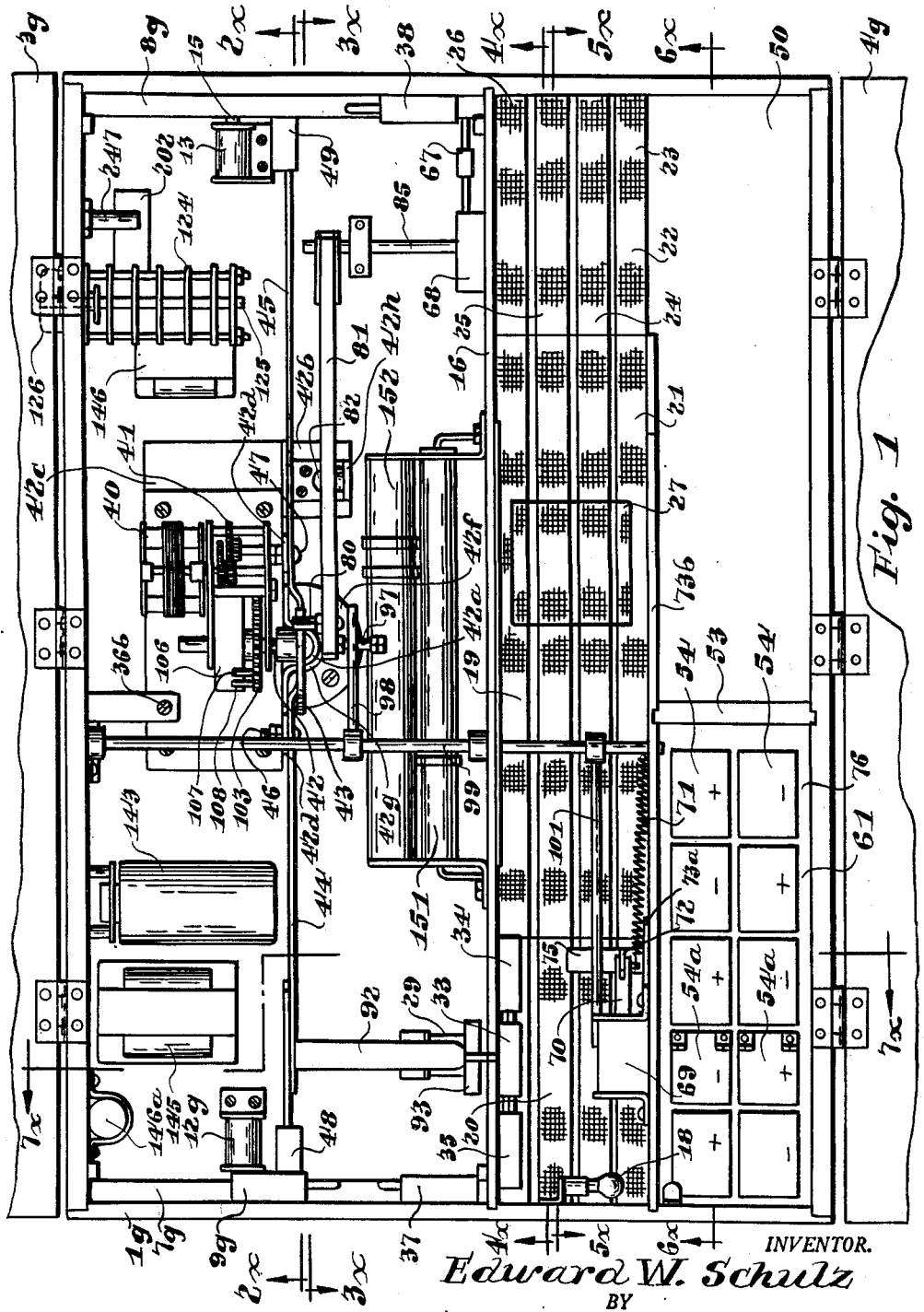
Figure 1 is a top plan view of the interior of the trap as it would appear when the hinged covers are laid open.
Figures 11, 12, 13:
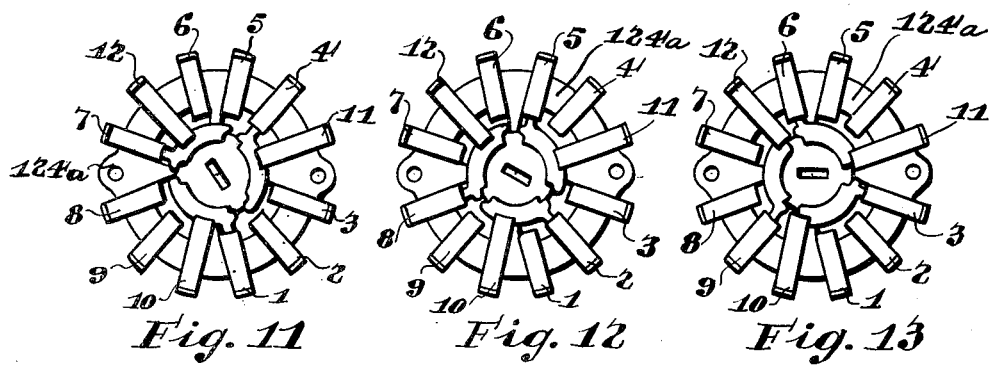

Figure 11 shows one of the six rotary switches with the large stationary disc and its corresponding small rotating disc operating in connection with it in the rotary switch 124 shown in Figure 1. The small rotating disc is shown in its first position that it takes with the battery current when six volts is used. Figure 11 shows the parts of the switch as they would appear when viewed from the back in which case the small disc would appear to rotate counterclockwise.

Figure 12 shows one of the same rotary switches shown in Figures 1 and 11 with the large stationary disc and its corresponding small rotary disc operating in connection with it, forming part of the rotary switch 124. The small disc is shown in mid or second position which is the position it will take when a direct current of 110 volts is used or an alternating current of 110 volts, 25 cycles is used.

Figure 13 shows one of the six rotary switches with the large stationary disc and its corresponding small rotating disc operating in connection with it in the rotary switch 124 shown in Figure 1. The small rotating disc is shown in its third position or the position it will take when 110 volt A. C., 60 cycle current is used.

Figure 13A:
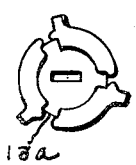

Figure 13a is a detail view of the small disc with the three segmental contacts thereon.

Figure 10:
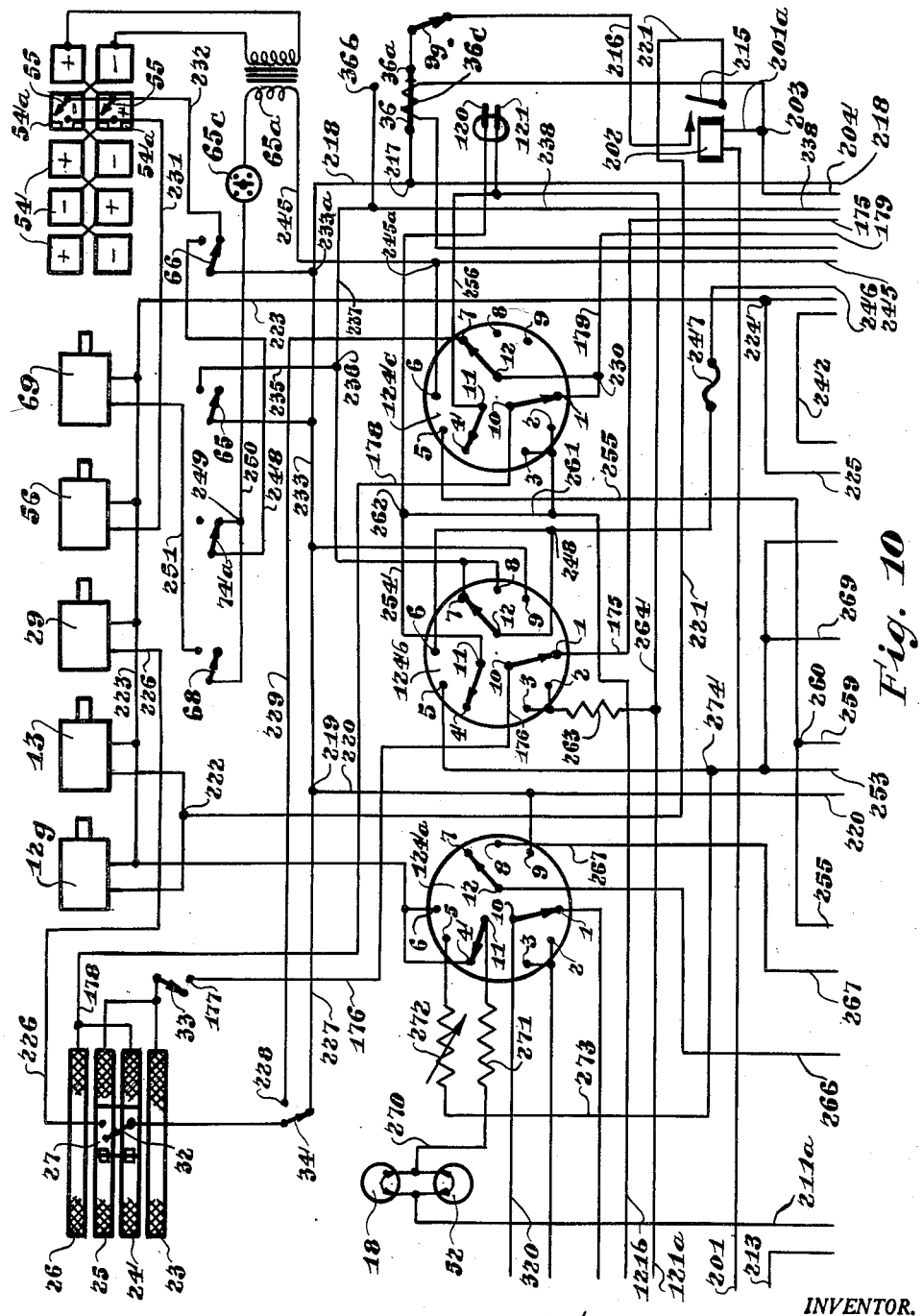
Figure 10 is a diagrammatic view of the upper half of the wiring diagram of the trap omitting the wiring diagram of the wave wall unit.
Figure 10A:
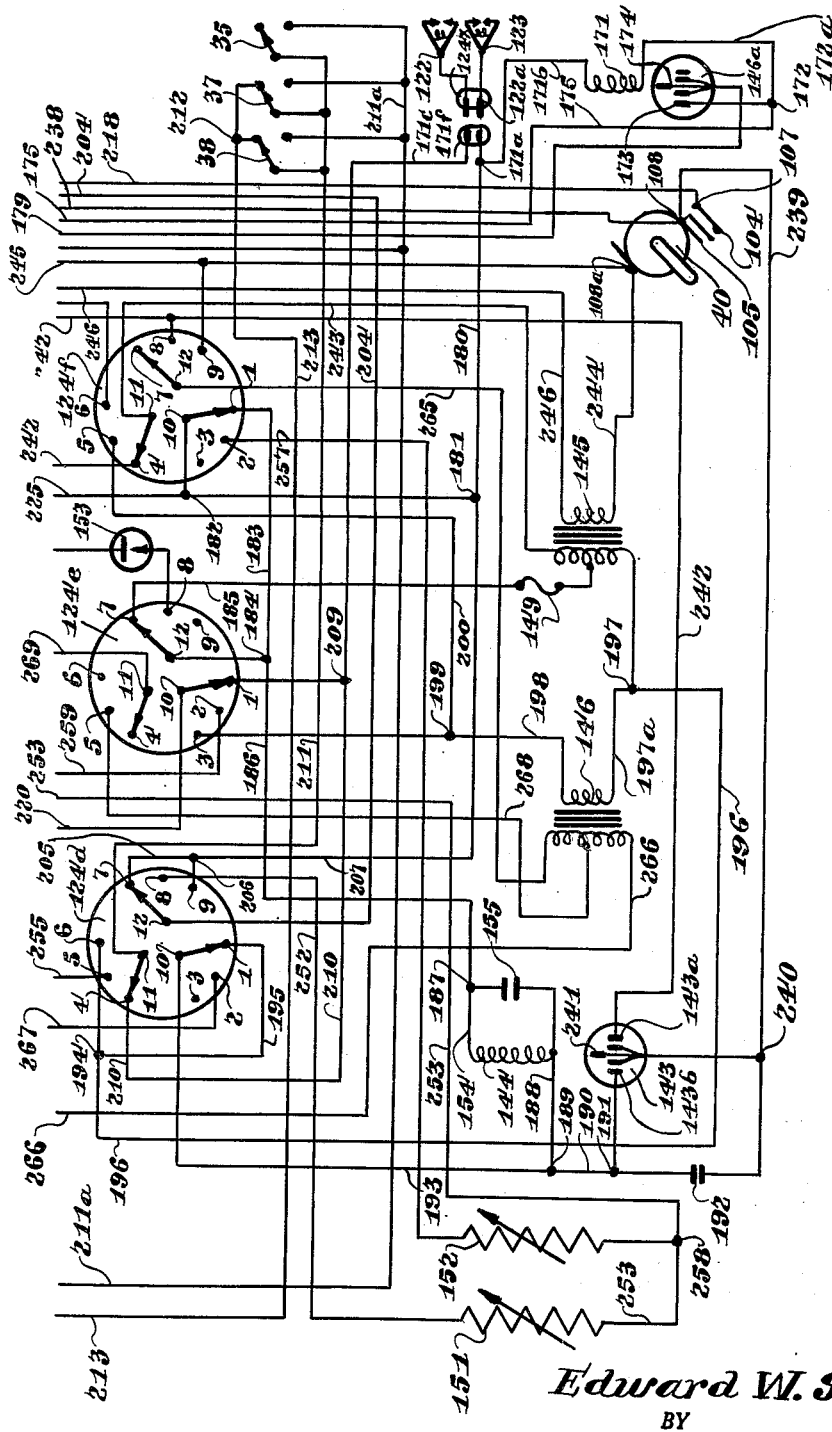
Figure 10a is a diagrammatic view of the lower half of the wiring diagram of the trap, omitting the wiring diagram of the wave wall unit.
Figure 14:
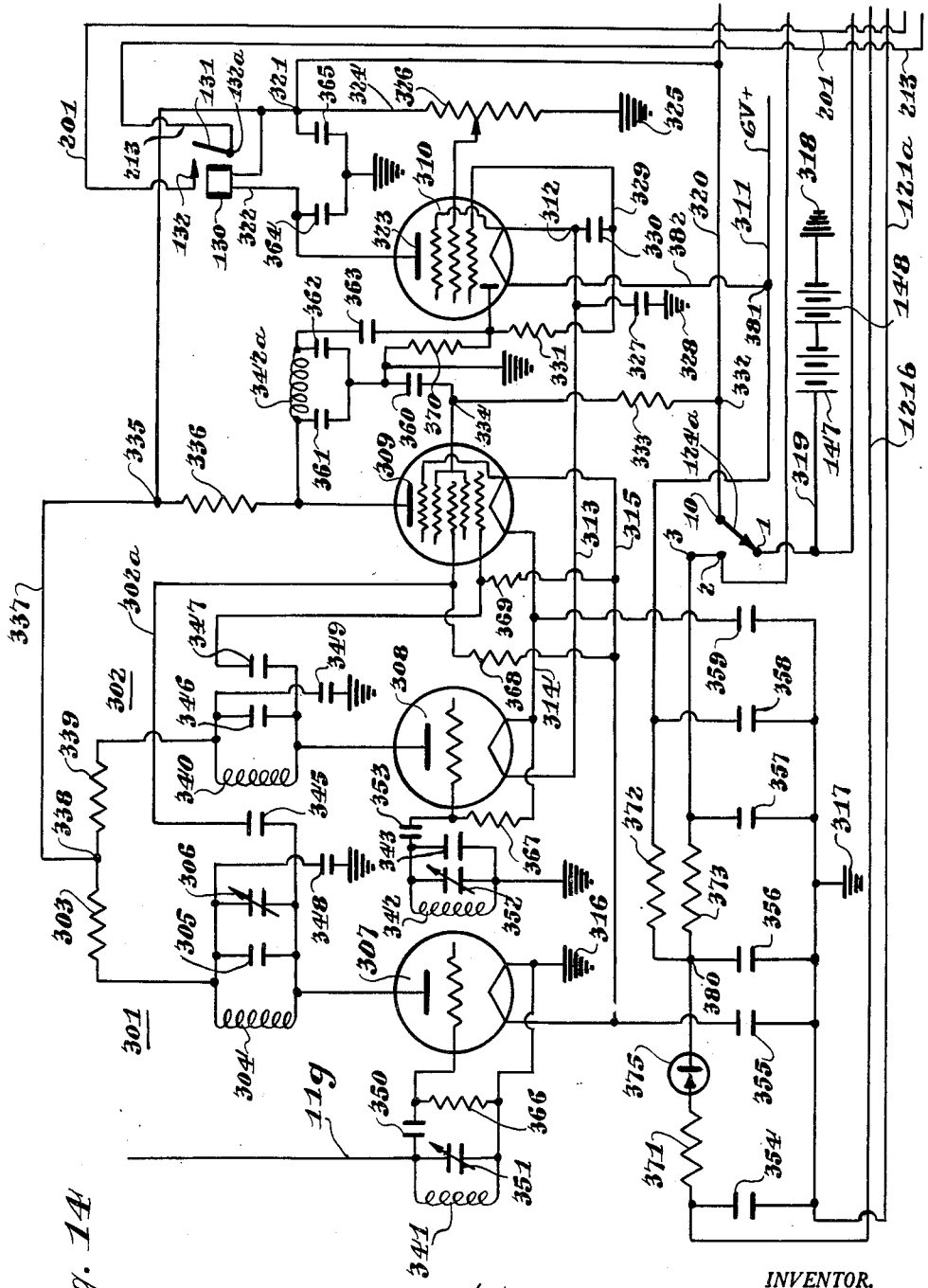

Figure 14 is a wiring diagram of the wave wall unit, which is not shown in Figures 10 or 10a.

Figure 15:
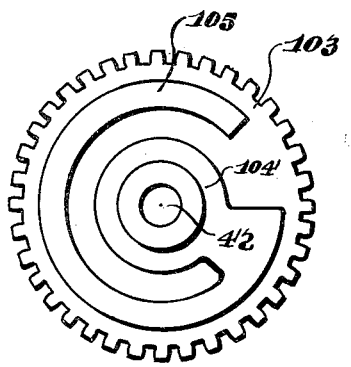

Figure 15 is a detail view of the gear 103, forming part of the reducing gear unit that carries the mutilated copper rings that are used to break the circuit under certain conditions. See column 8, line 66.

Figure 16:
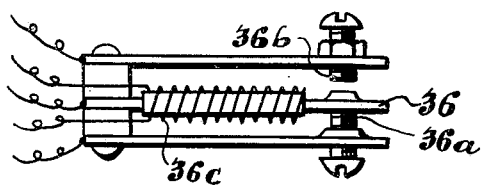

Figure 16 is a side elevation of the thermostatic switch shown in Figures 1 and 10.

Figure 17:
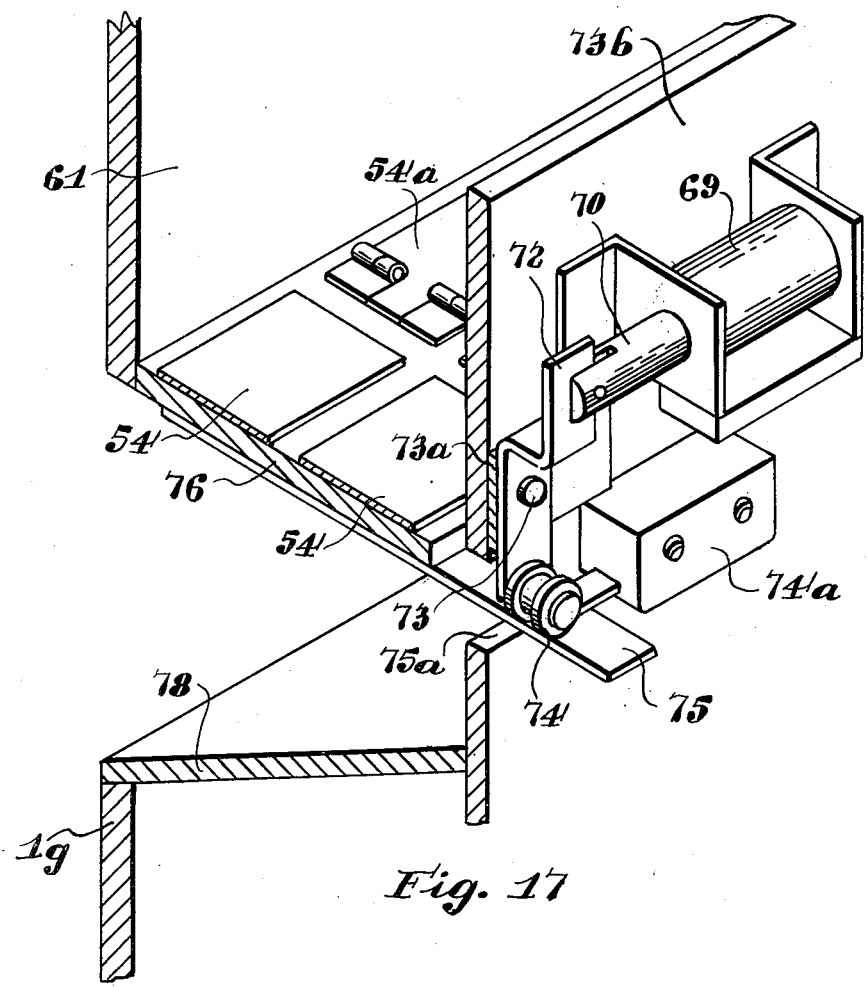

Figure 17 is a perspective view of the trap door and the solenoid that controls the operation of it.

In the several figures of the drawings like reference numerals indicate like parts.

The trap is enclosed in a boxlike structure indicated by the reference numeral 1g from which more or less of the bottom is omitted as will be explained later. The top of the trap is covered by two hinged covers 3g and 4g as is indicated in Figure 1. The trap contains a runway for the rats, the length of which runway is indicated at 5g in Figure 2 and the width of it is indicated at 6g in Figure 7. From this runway the bottom is omitted. At one end of the runway is a vertically sliding door 7g and at the other end of the runway is a vertically sliding door 8g. When these doors drop as will be explained later they close the openings 2 and 10g. The animal can enter the trap at either opening and it is the object of the trap to prevent the rat from leaving by either opening.

Across the ceiling of this runway and in the middle thereof is a so-called pickup wire 11g which operates in connection with the so-called wave wall unit located in the upper chamber shown in Figures 2 and 3 which will be described more especially hereafter. These units cause an oscillation of high frequency waves, which waves oscillate across the runway. When the animal gets near enough to the wire 11g, he disturbs the frequency of the radiations or oscillations as will be explained later and this in turn causes a current to be established in the solenoid magnets 12g and 13 shown in Figure 1. Each of these magnets or solenoids have a core which is drawn into the solenoid when the solenoid is energized and normally is pushed out by a spring not shown. These cores are indicated at 14 and 15.

Each of these cores engages in a hole in its adjacent door 7g and 8g and holds the door up. When the door 7g is open or in its raised position it holds the microswitch 9g closed, but no current passes through it until the circuit is closed by a solenoid switch 130 in the wave wall unit which will presently be described. (See Figure 14 and the leads 132.)

These microswitches are such as described in Patent No. 1,960,020 and are a standard article of manufacture, which by themselves constitute no part of my invention. It is the switch that is the most convenient for use in several places in the trap inasmuch as the contacts move only a few one thousandths of an inch in opening or closing.

When the door 7g drops it is because the frequency oscillations of the wave wall unit have been disturbed by an animal which causes the solenoid switch 130 shown in Figure 14 to close the circuit in which the microswitch 9g is located. In this circuit is also included the solenoids 12g and 13 and when this circuit is closed the cores of the solenoids 12g and 13 are drawn out from the doors 7g and 8g. This permits the doors to drop by gravity and close the openings 2 and 10g. When the door 7g drops it opens the microswitch 9g and opens the circuit controlled thereby and deenergizes the solenoids 12g and 13. When the doors 7g and 8g drop by gravity they close the openings 2 and 10g and enclose the animal, in the runway.

All of the five solenoids 12g 13, 29, 56 and 69 used in the trap have a spring which normally presses the core out when the solenoid is deenergized. This is not true of the solenoid 130.

Figure 3:
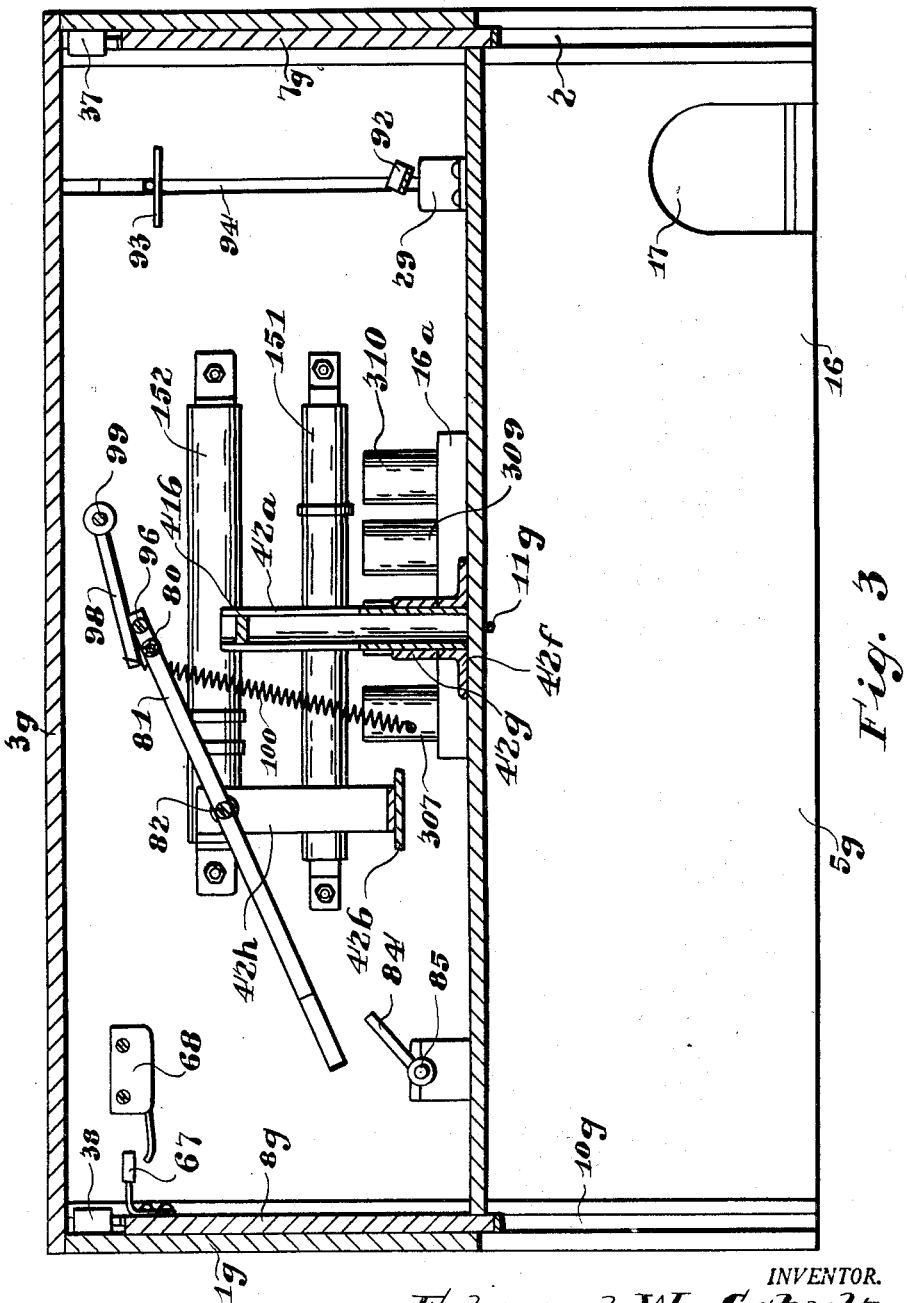
Figure 3 is a vertical section on the line 3x, 3x of Figure 1, looking in the direction of the arrow.
Figure 4:
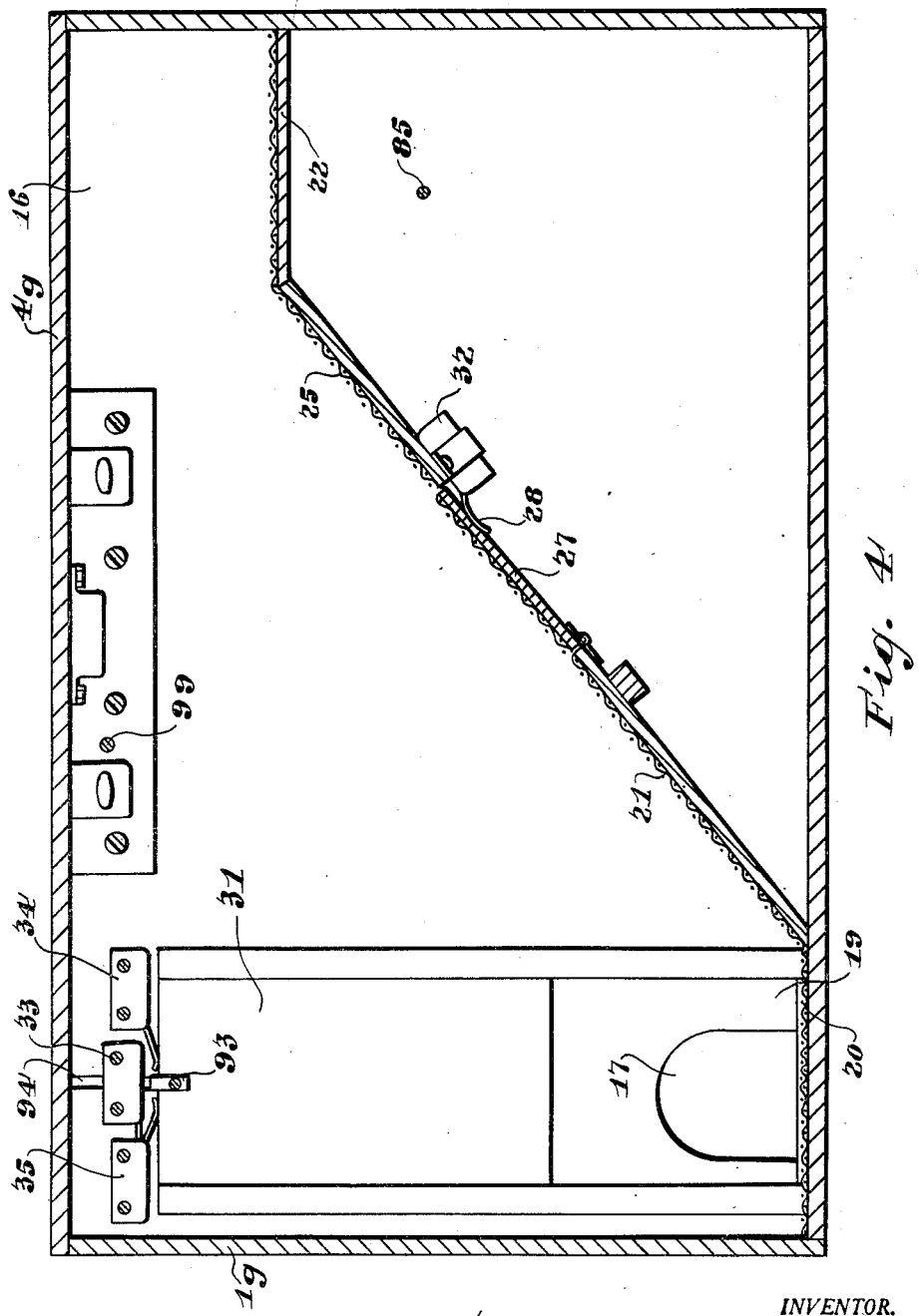
Figure 4 is a vertical section on the line 4x, 4x of Figure 1, looking in the direction of the arrow.
Figure 7:
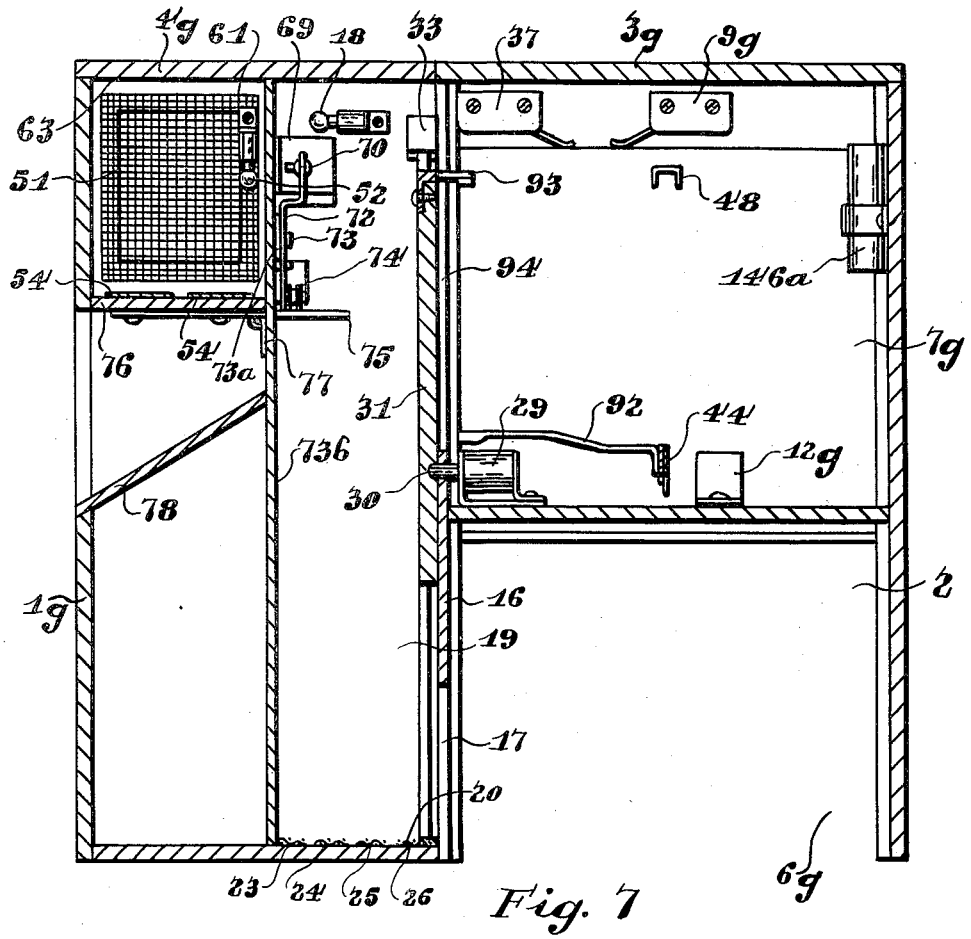
Figure 7 is a vertical section on the line 7x, 7x of Figure 1, looking in the direction of the arrow.

One side of the runway is closed by the partition 16 shown in Figures 1 and 7 and in this partition is an opening 17 shown in Figures 3, 4 and 7. On the far side from the runway a small light is burning which shows through this opening. This light is indicated at 18 in Figure 7. The animal is attracted by the light and is induced to pass through the opening 17 into the chamber 19 having the lower deck 20 from which leads the ramp 21 and the upper deck 22. The lower deck, the ramp and the upper deck are covered with four parallel strips of screen 23, 24, 25 and 26, which strips of screen are shown in Figures 1 and 10. The strips 23 and 25 are connected to and electrified by one set of wires and the strips 24 and 26 are connected to and electrified by another set of wires. Between the wires and their corresponding strips is a potential of about 70 volts either A. C. or D. C. These strips are normally on open circuit.

As the animal travels up the ramp, he travels over the swinging door 27. The upper end of this swinging door 27 is normally held in a raised position by the blade spring 28 which is a part of a so-called microswitch 32. (See Figs. 4 and 5.) This switch is normally open and when the animal steps on the door he closes the switch 32 by pressing the door 27 down. On the closing of the switch, a solenoid 29 is energized which pulls a core 30 (see Fig. 7) which releases the door 31 which falls down by gravity and closes the opening 17.

At the top of this door 31 is another so-called microswitch 33 which is normally open when the door 31 is raised up and is closed when the door drops.

When this switch 33 closes it energizes the circuit through four strips of screen. The animal's feet will rest simultaneously on both an odd and even numbered strip. The current will flow through the animal's body and give him a shock, which will cause him to travel up the ramp onto the upper deck 22.

When the door 31 drops it opens up the microswitches 34 and 35 (see Fig. 4). When the microswitch 34 opens up, it opens the circuit that energizes the solenoid 29 and a spring inside of the solenoid presses the pin 30 out, so that it rests against the door, and when the door is raised as will hereinafter be described the pin will engage in the recess of the door 31 and hold it up.

When the door 31 drops it opens a microswitch 35 (see Figs. 1 and 4) and this opens the circuit that normally energizes the lamp 18 (see Figs. 1 and 7). In this circuit is the resistance coil 36c that is placed on and heats the thermostat switch or blade 36 (see Figures 1, 2 and 10). The resistance coil on the thermostat blade switch 36 heats the switch and causes it to bend away from the contact 36a toward the contact 36b.

This same heating effect of the thermostat switch is also secured by a circuit controlled by the microswitch 37 shown in Figure 7. In the assembly shown in Figure 7, the microswitch 37 is closed by the dropping of the door 7g, it being understood that the microswitch can be wired so as to be open when the arm is pressed up and will be closed when the arm drops down or vice versa.

The circuit can also be closed by the switch 38 shown in Figures 1 and 3 in which case it is operated by the falling of the door 8g to close the circuit.

It will also be understood that the thermostat blade 36b is straight when it is cold and makes contact with the contact 36a. When in this position it closes the circuit that operates the wave wall unit located in the upper chamber shown in Figures 2 and 3.

The current that operates the so-called wave wall unit 16a in Figure 3 passes through the thermostat blade 36 and contact 36a. As soon as the radiations of the wave wall unit are interrupted by an animal it causes the solenoids 12g and 13 to operate to release the doors 7g and 8g that they will drop and close the ends of the tunnel. The dropping of the doors closes the microswitches 37 and 38. These switches close the circuit that sends the current through the coil that heats the thermostat blade 36. As the thermostat blade 36 heats up it begins to bend away from the contact 36a.

As long as the thermostat blade is in contact with 36a the wave wall unit is in operation and sends out radiations. As soon as the doors 7g and 8g drop, the wave wall unit ceases to operate as above described.

It sometimes happens that a cat gets into the runway and gets locked therein by the dropping of the doors. It is obvious that a cat could not get through the small opening 17. In such case it is desirable to have the doors 7g and 8g raised so that the cat can get out. These doors are then raised by the mechanism that will now be described. As long as the doors 7g and 8g are closed a current will flow through the resistor that will heat the thermostat blade 36. This current will also flow if at any time the door 31 is closed.

When the doors 7g and 8g and 31 are up the circuit that heats the thermostat blade is open and the thermostat blade remains cold and makes contact with the contact 36a. During this contact the wave wall unit is in operation, but when the radiations from the wave wall unit are interrupted by the animal, the solenoids 12g and 13 operate to release doors 7g and 8g which close. Then the heating of the thermostat blade 36 begins and as the blade heats up it bends and swings away from the contact 36a and this shuts off the wave wall unit from operating. As the thermostat blade heats up more and more, it bends more and more and in a few minutes it will come into contact with the contact 36b and permit the current to flow through another circuit which energizes the motor 40 which turns the reducing gear unit 41.

Figure 2:
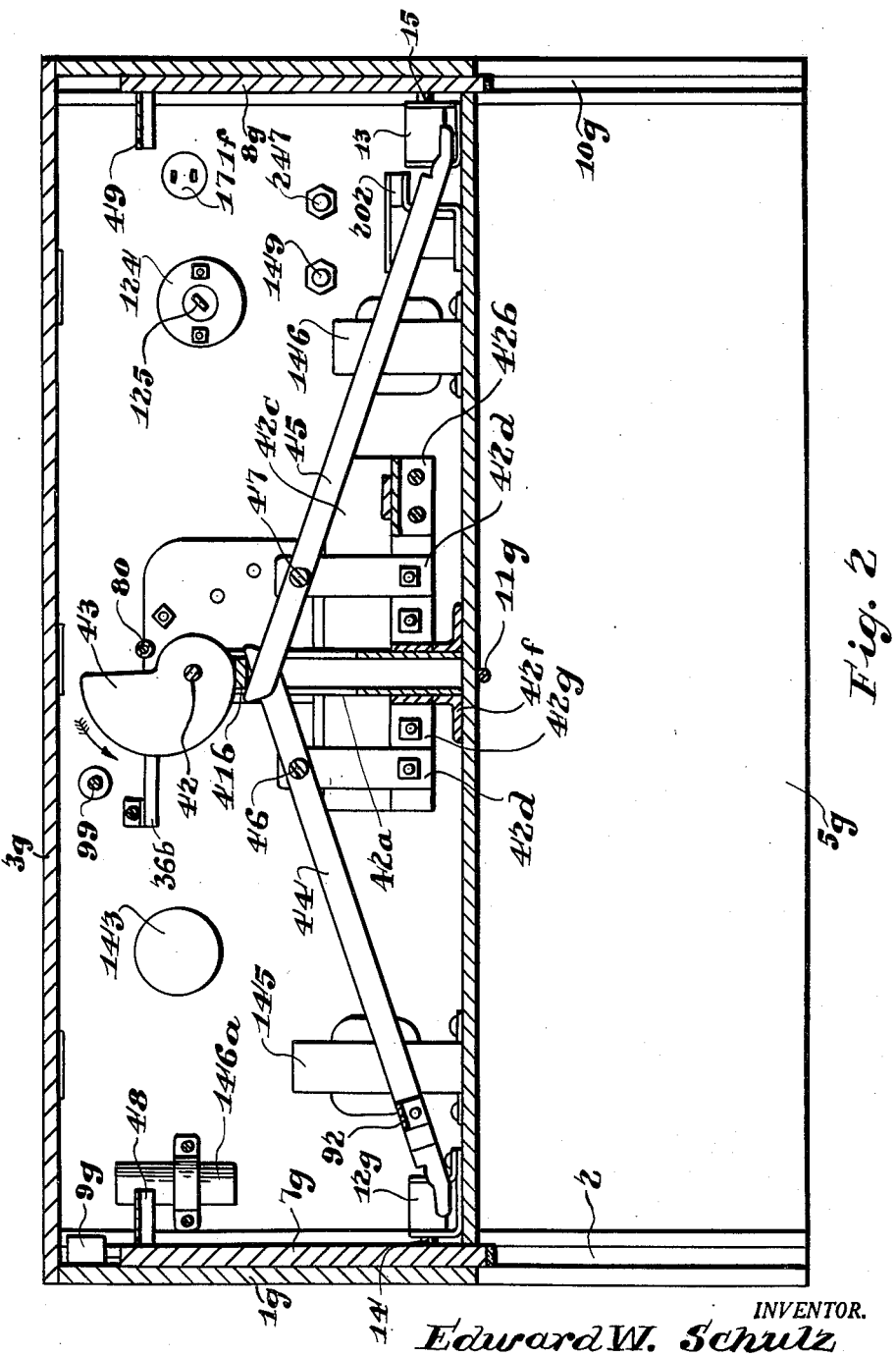
Figure 2 is a vertical section on the line 2x, 2x of Figure 1, looking in the direction of the arrow.

This unit in turn turns the output shaft 42 (see Fig. 2).

On this shaft is a cam 43 which turns through one revolution for about twelve hundred turns of the motor shaft gear. This cam 43 pushes down the short ends of the levers 44 and 45. The levers 44 and 45 are pivoted at 46 and 47 in Figure 2.

The short ends of the levers 44 and 45 engage in a guideway formed in a tube 42a by cutting a slot across the tube as shown in Figure 2. The short ends of the levers extend through and a little beyond the tube and one or both of the short ends are offset, if necessary outside of the tube to bring the short ends parallel with each other inside of the tube. This tube is supported in a floor plate 42f. On this tube is placed a semicircular strap 42g shown in Figures 1 and 2. The ends of the strap are bolted to the block 42c and supports the block on the tube. The lower ends of the strap rests on top of the floor plate 42f.

Bolted to the block 42c are the uprights 42d, 42d on which the levers 44 and 45 are pivoted. Mounted to slide in the upper end of the tube 42a is a round brass slug 41b, which rests upon the short ends of the levers 44 and 45. This slug slides freely in the tube. When the cam 43 rotates, it presses down on the slug 41b and through the slug presses down on the short ends of the levers 44 and 45, causing the long ends of the levers to raise and raise the doors 7g and 8g.

On the right of the block 42c is a bracket 42b shown in Figures 1, 2 and 3. This bracket supports the upright 42h shown in Figure 3 on which the lever 81 is pivoted. This lever is shown in Figures 1 and 3.

The long arms of the levers engage with the brackets 48 and 49 carried on the doors 7g and 8g respectively and raise the doors high enough so that the cores of the solenoids 12g and 13 can engage therewith and hold them up. This gives the cat an opportunity to get out of the runway. When the doors are fully raised it opens the circuit of the heating coil on the thermostat blade by opening the microswitches 37 and 38 and permits the thermostat blade to cool off and bend back to make contact with the contact 36a and while the blade is in transit the wave wall unit is inoperative and the solenoids 12g and 13 remain firmly engaged with the doors in their raised position. During this time the cat can get out. If the cat remains in the tunnel until the thermostat blade makes contact with the contact 36a the wave wall unit will operate to close the doors 7g and 8g and then the above cycle of operations will be repeated, giving the cat an opportunity to get out of the tunnel at the end of each period of about five minutes.

Figure 6:
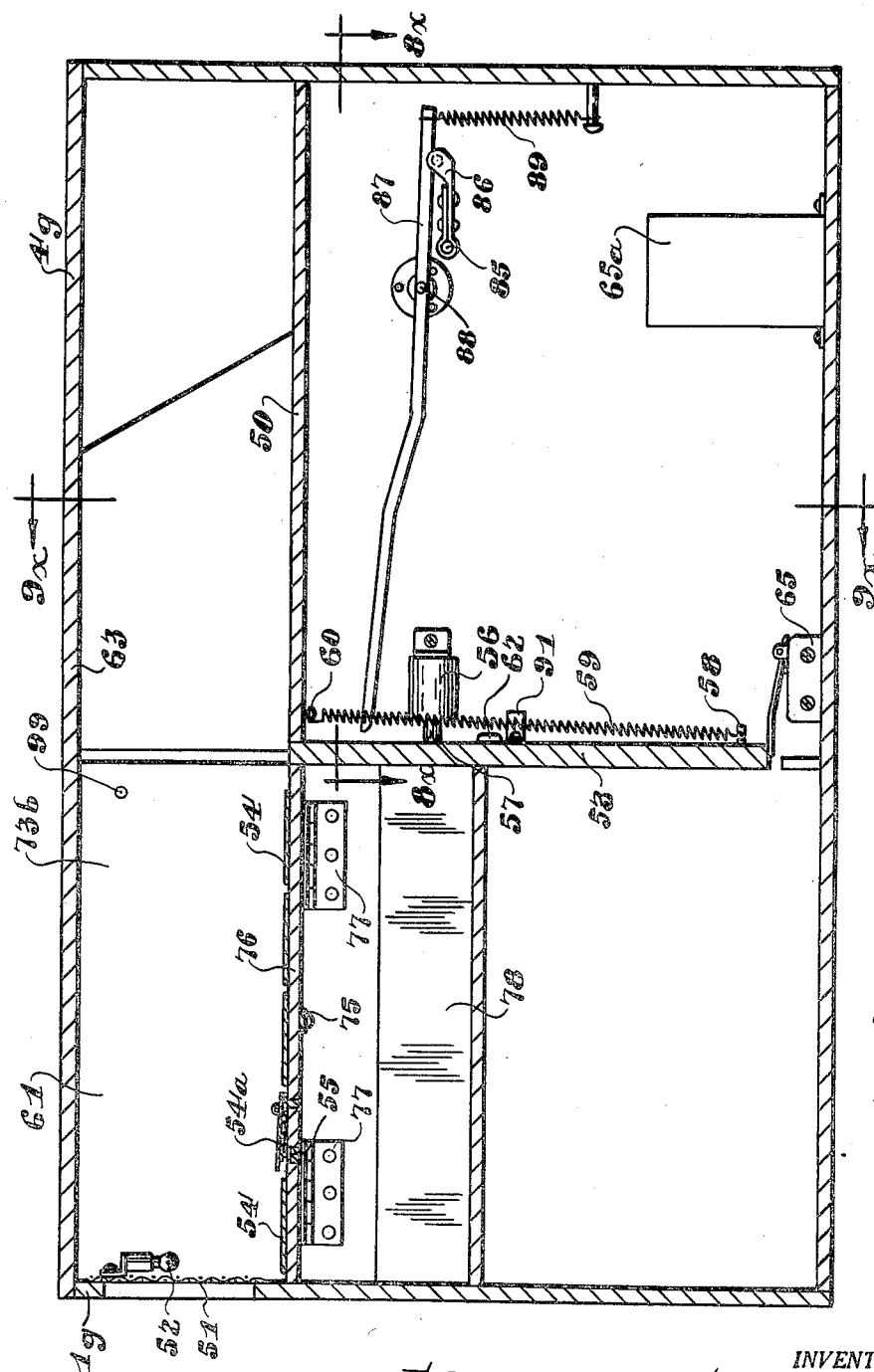
Figure 6 is a vertical section on the line 6x, 6x of Figure 1 looking in the direction of the arrow, showing the door 53 in the lower position.
Figure 8:
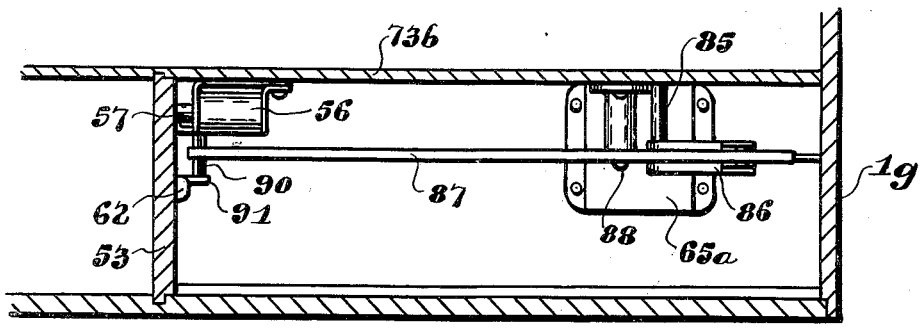
Figure 8 is a horizontal section on the line 8x, 8x of Figure 6, looking in the direction of the arrow.
Figure 9:
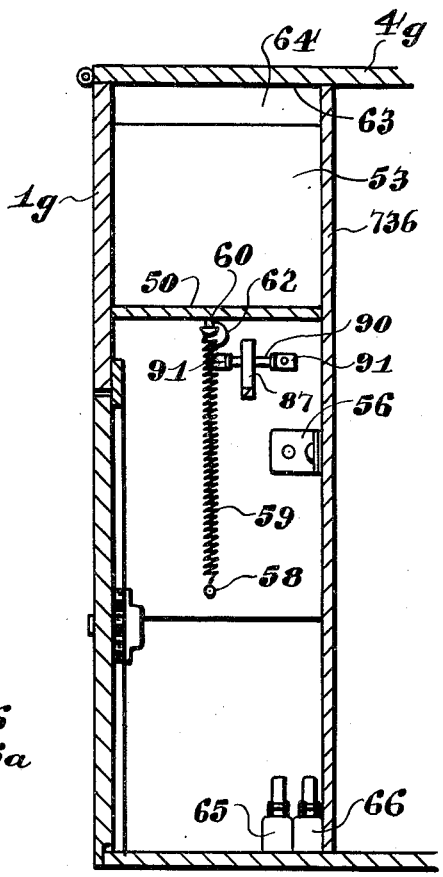
Figure 9 is a vertical section on the line 9x, 9x of Figure 6, looking in the direction of the arrows and showing the door 53 in the raised position.

When a rat has got on the upper deck 22 it can turn to the right and get on the level runway 50. This runway extends from the lower right hand corner to the lower left hand corner in Figure 1. At the left hand end of the runway a wire screen 51 is provided with a lamp 52. This light will attract the rat to the screen. In going to the screen the rat will pass over the sliding door 53 (see Fig. 6). The rat then passes over the plates 54, 54 of which there are ten as shown at the lower left hand corner of Figure 1. These plates are carried on the trap door 76. Each of these plates is stationary except the two plates 54a, 54a which are hinged. These plates are also shown in Figure 6. When the rat makes contact with the plates 54a, 54a he pushes them down and closes a circuit at 55. This circuit energizes the solenoid 56 (see Figs. 6, 8 and 9) and causes the core 57 to be withdrawn from engagement with the fourth door 53. At its lower end this door has a bracket 58 to which the lower end of the spring 59 is connected. The upper end of this spring is fastened to a pin 60. The contraction of this spring raises the door 53 a predetermined amount as shown in Figure 9 and encloses the rat in the chamber 61. The upward travel of the door 53 is limited by a block 62, which strikes against the under surface of the runway 50 and keeps the door from making contact with the ceiling 63. This leaves an opening between the top of the door and ceiling 63 as indicated at 64 in Figure 9. This opening is large enough so that the tail of a rat cannot be caught between the top of the door 53 and the ceiling of the chamber.

When a door 53 raises, it releases the microswitches 65 and 66. Switch 65 is shown in Figures 6 and 9 and switch 66 is shown in Figure 9. When the microswitch 65 closes it energizes the plates 54, 54 so that the current flows through the body of the rat from a positive plate in Figure 1 to a negative plate or vice versa. These plates are also shown at the upper right hand corner of Figure 10.

The plates are marked with a positive or negative sign to show how the plates are connected up.

The current that flows is strong enough to kill the rat in a few seconds.

After the current is on a predetermined time and the rat is dead it is then necessary to remove the rat and set the trap for another cycle of the same operations. This is done as follows: When the door 53 raises, it releases the arm of the microswitch 65, permitting the switch to close. This energizes the plates 54 and starts the motor 40 in Figures 1 which in turn rotates the cam 43 slowly through the reducing gear unit 41 and moves the levers 44 and 45 to raise the doors at the end of the tunnel or runway (see Fig. 2). The cam 43 is shown in its starting and stopping position in Figure 2 and it rotates to the left as indicated by the arrow.

By the time the shaft 42 and the cam 43 has rotated 180° the doors 7g and 8g have been raised up and locked in their raised position by the cores of the solenoids 12g and 13.

When the door 53 rises it opens the microswitch 66. When the door is down, this switch is closed but is on open circuit. The open circuit is closed when the rat steps on the door 54a in Figure 6 thereby pushing it down and making contact with the contact 55. This closes the circuit and energizes the solenoid 56 which releases the door 53 which is drawn up by the spring 59, releasing the microswitch 66 in Figure 9 which in turn opens the circuit.

Figure 5:
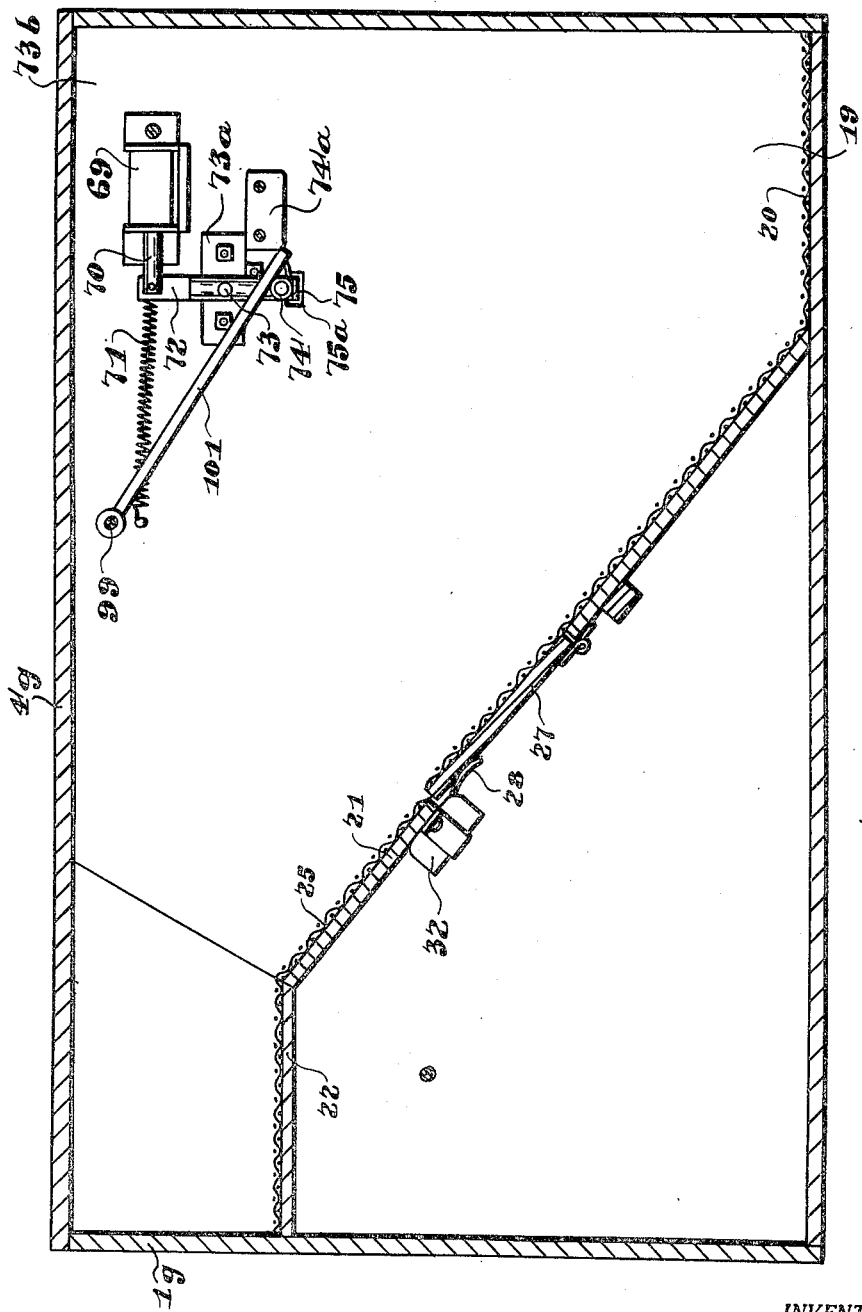
Figure 5 is a vertical section on the line 5x, 5x of Figure 1, looking in the direction of the arrow.

The door 8g carries a bracket 67 which closes the microswitch 68 shown in Figure 3 and energizes the solenoid 69 shown in Figure 5. This causes the core 70 of the solenoid 69 to move to the right in Figure 5, pulling on the spring 71.

This rocks the lever 72 pivoted on the axle 73 which is carried on the plate 73a which plate is fastened on the partition 73b. The lever 72 is offset at the top so that it will more conveniently engage with the core 70 of the solenoid 69 (see Fig. 7).

At the bottom of the lever 72 is carried a roller 74. All this is shown in Figures 5 and 7. Normally this roller 74 rests on the arm 75 and holds the arm down in the position shown in Figure 7. The other end of the arm or lever is riveted to the bottom of the trap door 76, which door is carried on hinges 77 as shown in Figure 7. When the lever 72 is moved to the right at the top in Figure 5 by the solenoid 69 the roller passes out from over the arm 75 and allows the trap door 76 to drop and allows the arm 75 to raise. The arm 75 extends through a hole 75a in the partition 73b. When the arm 75 raises, it releases the arm of the microswitch 74a (see Fig. 5) and opens the circuit that energizes the hot plates 54, 54 shown in Figures 1, 6 and 7 and opens the circuit in the solenoid 69, permitting the spring 71 to pull the lever 72 back toward its normal position until it is arrested by the arm 75 in its raised position.

This door 76 forms part of the deck 50 and carries the hot plates 54, 54 etc. shown in Figures 1, 6 and 10. The door drops down to an inclined position in which it is arrested by the fixed slide 78 (see Fig. 7) so that the dead rat slides down by gravity from the inclined trap door 76 and slide 78 to the floor outside of the trap. The trap door remains in this inclined position until it is reset as will presently be described.

All this happens while the cam 43 makes a half of its revolution. While the cam continues to rotate it engages the roller 80 carried on the lever 81 shown in Figures 1 and 3. This lever is pivoted at 82. The cam pushes the right hand end of this lever 81 up as shown in Figure 3. The right hand end of the lever 81 in Figure 3 is the same as the left hand end of lever 81 in Figure 1. This causes the left hand end of the lever 81 in Figure 3 to move down and it engages with the arm 84 on the shaft 85 to rotate it. This shaft is a long shaft and extends to the outer side of the trap where it carries the arm 86 as is shown in Figures 6 and 8. It rotates this arm 86 up and moves the lever 87 carried on the pivot 88. In so doing, it pulls on the spring 89 and pushes down the left hand end of the lever 87 which engages a roller 90 carried in brackets 91, which are mounted on the door 53 (see Figs. 6, 8 and 9). This pushes the door 53 down from its raised position in Figure 9 to the position shown in Figure 6. The core 57 on the solenoid 56 then engages the door 53 and locks the door in its lowest position. This opens the switches 65 and 66 shown at the bottom of Figure 9.

While the doors 7g and 8g are being reset to open the ends of the runway, the door 31 is raised in a manner that will now be described.

On the lower end of the lever 44 is an arm 92 extending sideways therefrom. This is shown in Figures 2 and 7. The door 31 has on it a bracket 93 which travels in a slot 94 in the partition 16 as shown in Figures 1, 3 and 7.

When the door 31 is down, the bracket 93 is located just above the arm 92 shown in Figure 7. When the lever 44 swings, the arm 92 engages the bracket 93 and raises the door to its highest position in which it is engaged by the spring pressed core 30 of the solenoid 29 and is locked in its raised position by the solenoid.

When the door 31 is raised to its highest position, the microswitches 33, 34 and 35 shown in Figure 4 are restored to their open position. The lever 44 is then allowed to drop to its initial position as shown in Fig. 2 because the cam 43 has rotated far enough to release it.

The trap door 76 is raised to its normal position by a mechanism that will now be described. On the near side of the lever 81 in Figure 3 is carried a roller 80. On the far side of the lever 81 is carried a pin 96 on which is carried a roller 97 (see Fig. 1). This roller 97 moves up with the right hand end of lever 81 in Figure 3 and engages the arm 98 keyed to the shaft 99 shown in Figures 1 and 3. The arm 98 is normally held against the roller 97 by the spring 100 shown in Figure 3. When the arm 98 is raised it rocks the shaft 99, which extends nearly across the trap as shown in Figure 1. Remote from the arm 98 is the arm 101 carried on the same shaft 99 and extending in the opposite direction from the arm 98. The raising of the arm 98 carries the arm 101 down in Figure 5. This arm 101 engages the arm 75 and pushes it down and raises the trap door 76 up to its normal position. The tension of the spring 71 in Figure 5 pulls the lever 72 to the position shown in Figure 5 and the roller 74 then engages over the arm 75 and locks it down and holds the trap door 76 in normal position. All this happens just before the cam 43 reaches the starting and stopping position shown in Figure 2. This completes the resetting of the trap.

The current that drives the motor of the reducing gear unit is turned on and off as follows: The large gear 103 of the reducing gear unit is carried on the output shaft 42 and rotates with the cam 43. On this reducing gear unit are two contact rings which are insulated from the gear. These rings are of copper and are concentric with the center of the gear 103. The inner ring 104 is a complete ring. The outer ring 105 is mutilated, having a small portion of it cut away.

On the insulating block 106 is carried two contact strips or brushes 107 and 108 that make contact with these copper rings as the gear 103 rotates. The contact brush 107 is always in engagement with the small ring 104, and the brush 108 is in contact with the outer ring 105 and causes current to flow to the motor while the circuit is closed by the two rings and the two brushes, it being understood that the brushes are in circuit with the terminals of the motor.

It is obvious that no current can flow through the motor when the brush 108 makes contact with the gap in mutilated ring 105. In order to insure the starting of the motor or the continued operation of the motor through one complete cycle a shunt thru the wires 238 and 218 is provided that carries the current while the brush 108 crosses the gap in the mutilated ring 105. In this shunt is provided a microswitch 65 which is placed at the bottom of the door 53 shown in Figure 6. When the door is down this switch is held in an open position, and when the door raises the switch closes and starts the operation of the motor. The switch closes the circuit that carries the current to the hot plates 54, 54 and causes the execution of the rats. It also carries the current to the heating element of the thermostat switch blade 36 shown in Figure 1.

It will also be understood that on this trap are five doors, four of which slide up and down and the fifth door is a trap door that swings. The two doors 7g and 8g are at the ends of the tunnel. These two doors are shown in Figures 1, 2 and 3. The third door is the door 31 that drops and closes the opening 17 shown in Figures 3 and 4. The dropping of this door closes the microswitches 33, 34 and 35 shown at the top of Figure 4 at the upper left hand corner. After the door 31 is down and the opening 17 is closed the rat must travel up the ramp 21 to the deck 22. He then goes on the deck 50. The rat is then attracted by the light 52 and travels toward the light and the screen 51. The rate then gets on the trap door 76 and steps on the hinge plates 54a shown in Figures 1 and 10, which closes the circuit which energizes the solenoid 56 and allows the door 53 to rise up behind him and close him in the death chamber. The door 53 is the fourth door and is shown in its lowest position in Figure 6 and in its highest position in Figure 9. When the door 53 raises, it closes a microswitch 65 which sends the current into the transformer which sends the high voltage current into the plates on the trap door 76, which current kills the rat. On this transformer 65a is a snap switch 65c which can shut off the transformer if it is desired to catch the rat alive. The closing of the microswitch 65 shown in Figure 6 also starts the motor 40 and its reducing gear unit 41, the operation of which raises the doors 7g and 8g and then raises the door 31 and releases the door 53 so that it can rise and drops the trapdoor 76, to eject the dead rat after which the trap door is returned to the position shown in Figure 7.

The cam 43 operates to return the five doors to their normal position as follows: The rotation of the cam 43 in Figure 2 raises the doors 7g and 8g and opens the ends of the tunnel. By raising the arm 92 in Figures 1 and 7, it also raises the door 31, uncovering the opening 17. This is done by the engagement of the arm 92 with the bracket 93 on the door 31 as shown in Figure 7. It then drops the trap door 76 on the raising of the door 8g, which closes the microswitch 68 when the bracket 67 engages with the switch on its upper movement (see Figures 1 and 3). This energizes the solenoid 69 which pulls the core 70 which moves the lever 72 (see Figure 5) which in turn releases the arm 75 and allows the trap door 76 to drop to eject the rat, after which the trap door is returned to the raised position shown in Figure 7 by the arm 101 shown in Figures 1 and 5. This arm swings down into contact with the arm 75, forcing it down and raising the door 76 to the position shown in Figure 7 in which position it is locked by the roller 74 shown in Figures 5 and 7.

The wiring diagram by which the foregoing electrical results are secured will now be described.

It will be understood that the electrical features of this trap can be operated by a current of 110 volts A. C., 25 or 60 cycle or 110 D. C. or can be operated by a storage battery current of six volts such as is used in an auto battery. When operated by 110 volts, the power wires are connected to the terminals 120 and 121 shown at the right in Figure 10. When a storage battery current is used with six volts, the connection is made at the terminals 122 and 123 shown near the lower right hand corner of Figure 10a.

From the terminals 120 and 121 and the terminals 122 and 123, the connections lead to a switch 124 having six large stationary discs and six small rotating discs. The large stationary discs are all enclosed in an insulating frame. These six smaller discs are carried on the shaft 125 to which they are keyed so that they all rotate together with the shaft. This shaft 125 extends outside of the housing where it is provided with a handle 126 by which it can be turned from one position to another of its three positions, it being understood that the shaft and its small disc is limited by mechanical stops to turning through a comparatively small angle.

As shown at the upper right hand corner in Figure 1, six of the rotary switches are aggregated in one combination, 124, held together in one frame, the small discs of which are operated simultaneously all by one shaft 125 and are turned collectively.

The shaft that carries the small discs is rectangular in cross section corresponding to the rectangular openings shown in the small discs in Figures 11, 12, and 13 and that the small discs all stand with their contacts in the same angular position on the shaft and will rotate together so that the connections that are made by the small discs with the radial contacts on the large discs is always the same in each of the six rotary switches.

The angular positions, which the shaft can occupy and to which it is limited in rotation are all shown in Figures 11, 12 and 13.

The shaft that carries the small discs is placed in the first angular position as shown in Figure 11 when the trap is operated by a 6-volt battery current.

It is placed in the second position as shown in Figure 12 when the trap is operated by 110 volt D. C. current or 110 volt A. C. current having 25 cycles.

It is placed in the third position shown in Figure 13 when the trap is operated by 110 volt, 60 cycle A. C. current.

The small discs are rotated counterclockwise in Figures 11, 12 and 13 because in these figures the switch is viewed from the rear. The small discs are rotated clockwise in Figures 10 and 10a because in those figures the switch is viewed from the front.

It will be seen that this is true by comparing the sequence of the numerals 1, 2 and 3 in Figures 11, 12 and 13 with the sequence of the numerals 1, 2 and 3 as they appear in the six large discs shown in Figures 10 and 10a.

Each of the six large stationary discs is made of insulating material and each of the small discs is also made of insulating material and the shaft that carries the small disc is insulated thereby from the segmental contacts on the small discs and the shaft is in no sense a conductor.

This is a stock switch and is made by several manufacturers.

It will be seen that in Figures 11, 12 and 13, the long radial contacts on the large disc are indicated by the numerals 10, 11 and 12 and that there are nine short radial contacts on each disc, three of them being placed between each pair of long contacts.

As shown in Figures 11, 12 and 13 there are three metal contacts on each of the small discs. These contacts are all alike. Each of these contacts is segmental in shape and at the end each segmental contact has an extension that can make contact with all of the twelve contacts on the outer disc. This extension can make contact with any of the nine short contacts for a useful purpose, but when they make contact with either of the long contacts on the outer discs, it will not be for a useful purpose. Therefore, the rotation of the small discs and the shafts on which they are carried is limited so that these extensions will contact only with the three short contacts to which it is adjacent when rotated counterclockwise in Figures 11, 12 and 13.

With the small disc in the position shown in Figure 11 the long contacts 10, 11 and 12 will make contact with the segmental contacts on the small disc, and the extension on those segmental contacts make contact with the short radial contacts 1, 4 and 7 and the 6-volt battery current will flow through them.

This is true of all of the three groups in Figure 11. That is, the 6-volt current will flow between the contacts 10 and 1 and will flow between the contacts 11 and 4g and between the contacts 12 and 7 and the other contacts will be idle.

With the small disc in the position shown in Figure 12 the 110 volt D. C. current or the 110 volt A. C. current, 25 cycle will flow from or between the contacts 10 and 2 and between the contacts 11 and 5 and between the contacts 12 and 8 or vice versa, and the other contacts will remain idle.

When the small disc is rotated to a position shown in Figure 13 the 110 volt, 60 cycle A. C. current will flow between the contacts 10 and 3 and between the contacts 11 and 6 and between the contacts 12 and 9 and the other contacts will be idle.

The setting of all of the six switches shown diagrammatically in Figures 10 and 10a corresponds to Figure 11 and the 6-volt battery current will flow.

By rotating the shaft one step clockwise in Figures 10 and 10a, all of the six switches will be brought to the position shown in Figure 12 and the 110 volt D. C. current or the 110 volt, 25 cycle A. C. current will flow.

By rotating the shaft two steps to the position shown in Figure 13 all of the six switches will be brought to the position in which the 110 volt, 60 cycle A. C. current will flow.

The six switches shown diagrammatically in Figures 10 and 10a are numbered 124a, 124b, 124c, 124d, 124e, 124f. The numbers of the contacts from 1 to 12 inclusive correspond to the numbers of the contacts in Figures 11, 12 and 13. The central disc is rotated about 22½ degrees to the first step and about forty-five degrees in all to the second step. The length of each segment on the central disc is about 110 degrees. This is long enough to make contact with the long radial contact 10 for example through three circuit closing steps. An air gap of about 10 degrees is left between two consecutive segments.

The three sources of power enumerated above are shown on the wiring diagram as will be seen elsewhere.

The current that operates the so-called wave wall unit 16a (see Fig. 3) passes through the thermostat blade 36 and contacts 36a. As soon as the radiations of the wave wall unit are interrupted by an animal it causes the solenoids 12g and 13 to operate to release the doors 7g and 8g so that they will drop and close the ends of the tunnel. The dropping of the doors closes the switches 37 and 38. These switches close the circuit that sends the current through the coil that heats the thermostat blade 36. As the thermostat blade 36 heats up, it begins to bend away from the contact 36a.

The current that operates the so-called wave wall unit passes through the thermostat blade 36. As long as the thermostat blade is in contact with 36a, the wave wall unit is in operation. As soon as the thermostat blade 36 moves away from the contact 36a the wave wall unit ceases to operate.

In this trap there are five solenoids as follows:

Solenoid 12g shown in Figures 1, 2 and 10. This solenoid locks the door 7g in its raised position.

Solenoid 13 is also shown in Figures 1, 2 and 10. This solenoid locks the door 8g in its raised position.

Solenoid 29 is shown in Figures 1, 2, 3 and 7 and locks the door 31 in raised position.

Solenoid 56 is shown in Figures 6, 8, 9 and 10 and locks the door 53 in its lowest position (see Figure 6).

Solenoid 69 is shown in Figures 5 and 7 and locks the door 76 in its raised position.

There are eleven microswitches in the trap which are enumerated as follows:

Microswitch 9g (see Figs. 1 and 2) which is opened by the door 7g when it drops.

Microswitch 32 (see Figs. 4 and 5) which is under the door 27. This closes the circuit that causes the door 31 to fall by gravity.

Microswitch 33 (see Figs. 1 and 4) is shown at the top of the door 31. It is held open when the door 31 is up and closes when the door 31 drops.

Microswitch 34 is shown in Figures 1 and 4. It is held closed when the door 31 is open and closes when the door 31 drops. When this switch open it deenergizes the solenoid 29 and releases the door 31 so that it can drop.

Microswitch 35 is shown at the top of Figures 1 and 4. It is held open when the door 31 is up and energizes the circuit that heats the thermostat blade switch 36 when the door drops.

Microswitch 37 shown in Figures 1 and 3 is closed by the dropping of the door 7g. This switch also closes the circuit for heating the thermostat blade switch 36.

Microswitch 38 shown in Figures 1 and 3 is closed by the dropping of the door 8g and closes the circuit for heating the thermostat blade switch 36.

Microswitch 65 is shown in Figures 6 and 9 and is placed under the door 53 and is held open by the door. When this switch closes it sends the current to the transformer 64a which sends the high voltage into the plates on the trap door 76 and it starts the motor 40.

Microswitch 66 is shown in Figure 9 and is held closed when the door 53 is down, but is on open circuit. Switch 66 is in series with the switch that is closed when the rat steps on the door 54a in Figure 6. This closes the circuit through the solenoid 56 through the switch 55 which up to this time has been closed.

The energizing of the solenoid 56 pulls the core 57 and releases the door 53 which is then drawn up by the spring 59, permitting the switch 66 to open, it being understood that switches 65 and 66 are both released at the same time. Microswitch 65 closes and microswitch 66 opens.

Microswitch 68 is shown in Figure 3 and when closed by the bracket 67 on the door 8g energizes the solenoid 69 shown in Figure 5. This works in connection with the trap door.

Microswitch 74a shown in Figure 5 is in series with microswitch 66 and with the contacts 55 closed by the door 54a, it being understood that the contacts 55 closed by the door 54a is not a microswitch. This switch carries the current to the hot plate. This switch 74a opens when the trap door falls.

The wiring diagram shown in Figures 10, 10a and 14 may be described as follows: When the rotary switch is set in its first position as shown in Figure 11 and the 6 volt battery current is used, the current flows as follows:

The 6 volt battery is connected to the apparatus at the terminals 124X indicated on the right hand side of Figure 10a. The plug comprising male and female parts is shown at 122a. The lower lead or wire goes through a junction 171a. From this junction 171a leads a wire 171b which goes down to the coil 171 of the vibrator. Beyond this, the wire leads to the junction 172, one side of which leads to one of the contacts 173 of the vibrator 174. The wire 175 on the other side of the junction leads to the contact 1 on the rotary switch 124b. This in turn is shown connected with the contact 10 of switch 124b by the blade or rotary arm that appears as an arrow. From this leads the wire 176 to the contact 177 of the microswitch 33 which is shown on open circuit at the upper left hand corner of Figure 10. When the door 31 is up this microswitch 33 is held open and when the door 31 drops this microswitch 33 closes and energizes the circuit through four strips of screen 23, 24, 25 and 26 shown in the upper left hand corner of Figure 10.

The circuit then extends through two of the four strips of screen; namely, 23 and 25 and then through the rat's body and through the strips of screen 24 and 26 back through the wire 178 back through the circular switch 124c to contact 10 through wire 179 to the center arm 174 of the vibrator 146A.

From the junction 171a leads the wire 180 to a junction 181 which in turn leads to a junction 182 which leads to a contact 10 on the circular switch 124f. This in turn leads to the contact 1, through the wire 183 through the junction 184 to the contact 12 in rotary switch 124e and through the switch to the contact 7 and through the wire 185 to the fuse 149 which leads to the transformer 145. The wire 186 leads from the junction 184 to the junction 187, which leads to the condenser 155 on one side and to the shunt lead 154 on the coil 144. From there it leads to the wire 188 to the junction 189. From there it leads on one side to the wire 190 through the junction 191 to the stationary contact in the vibrator 143 and on the other side it leads to the condenser 192. From the junction 189 leads the wire 193 to the contact 10 on the rotary switch 124d. From there the circuit leads to the contact 1 on this same rotary switch to the junction 194 through the wire 195. From the junction 194 leads the wire 196 to the junction 197 through which it leads to the transformers 145 and 146. From the transformer the circuit leads through the wire 198 through the junction 199 to the contact 3 on rotary switch 124e. This contact 3 is on open circuit. On the junction 199 leads the wire 200 to the contact 5 on rotary switch 124f which is on open circuit. From the junction 197 the wire leads through the fuse 149 and through the wire 185 to the contact 7 on switch 124e, which contact 7 is connected to contact 12 and to junction 184. When the rat enters the trap, the doors 7g and 8g must close the ends of the tunnel and close him in.

This is done as follows: The rat interferes with frequency of the radiations in the tunnel and this causes the wave wall unit to energize the solenoid switch 130 and draws the armature 131, closing the circuit between the terminals or contacts 132 and 132a, which are shown at the upper right hand corner of Figure 14. From the contact 132 extends the wire 201 to the solenoid switch 202 shown at the lower right hand corner of Figure 10.

From the solenoid switch the wire 201a extends to the junction 203 and to the wire 204 to the contact 12 on the rotary switch 124d. From contact 12 the current flows through contact 7 through the wire 205 through the junction 206 through the wire 207 through the junction 181 through the wire 180 to the junction 171a where the power originates or where the voltage starts. On the other side of the circuit at 171c the current flows through the junction 209 through the wire 210 through the contacts 4 and 11 on rotary switch 124d and through the wire 211 through microswitches 38 and 37 and junction 212 and through wire 213 to the contact 132a.

These contacts 132 and 132a are connected with the solenoid switch 130 of the wave wall unit shown at the upper right hand corner of Figure 14. This energizes the solenoid 202 shown at the right of Figure 10 and pulls the armature 215 and closes the circuit with the wire 216 which wire leads to the microswitch 9g and thence to the junction 36a and thence through the thermostat blade 36 to the junction 217 and through the wire 218 to the junction 219 through the wire 220 to the contact 10 on the rotary switch 124e and thence to the contact 1 on this same rotary switch and then to the junction 209 and on the wire 171c to the female plug 171f and containing the terminals for the 6-volt battery.

The under side of the circuit from the armature 215 goes through the wire 221 and up to the junction 222 through which the solenoids 12g and 13 are energized which release the doors 7g and 8g and encloses the rat in the tunnel. From these solenoids the current leads back through the wire 223 to the junction 224 through the wire 225, the junction 182, through the junction 181 through the wire 180 to the female plug 171f.

The animal then goes through the opening 17 on to the ramp 21. In so doing he steps on the trap door 27 and closes the microswitch 32 shown at the upper left hand corner of Figure 10. This closes the circuit then through the wire 226 at the upper left hand corner of Figure 10, which leads to the solenoid 29, which in turn is connected to the wire 223 which is connected to the junction 224 and to the wire 225 and from there to junction 181 to the wire 180 to the female plug 171f. The other side of the circuit leads from the microswitch 32 through the switch 34 over the door 31 and comes back to the wire 227 to the junction 219 to the wire 220 through the contacts 10 and 1 on the rotary switch 124e and thence to the junction 209 and then to the wire 171c and then to the female plug 171f.

The operation of the solenoids 29 releases the door 31 and lets it fall.

When the door 31 falls it energizes the microswitches 33 and 34. That is, it closes the contact between 33 and 177 shown at the upper left hand corner of Figure 10 and energizes the screen strips 23 and 25. The current then flows through the wire 176 through the contacts 10 and 1 on the rotary switch 124b and through the wire 175 through the junction 172 at the lower right hand corner of Figure 10a through the stationary contact 173 on the vibrator 146a.

The vibrator reed 174 converts the 6-volts D. C. to 6-volts A. C. This 6-volt A. C. current is enough to tickle the feet of the animal on the ramp and urge him on up the ramp but in order to do this the current must flow through the body of the animal and therefore the screen strips 24 and 26 must be energized as well. These screen strips are energized as follows:

When the switch 33 is closed and the screens 23 and 25 are energized, the current will flow through the body of the animal to the screens 24 and 26 and thence to the wire 178 through the contacts 10 and 1 on the rotary switch 124c through wire 179 to the vibrator reed 174 of the vibrator 146a. When the door 31 drops, the switch 34 makes contact with the contact 228. The current then travels through the wire 229 through the contacts 7 and 12 of the rotary switch 124c and then through the junction 230 and then through the wire 179 to the vibrating reed 174 of the vibrator 146a.

When the animal steps on the trap door 27 he closes the microswitch 34 and starts the vibrator 174 to vibrating. When the vibrator operates the screens 23 and 25 are charged on one side of the circuit, and the screens 24 and 26 are charged on the other side of the circuit, and the circuit is closed through the body of the animal. This 6-volt circuit tickles the feet of the animal and urges him up the ramp. When either of the screen strips 23 or 25 is connected to either of the screen strips 24 or 26 by the animal the current can then flow through the body of the animal from the one pair of screen strips to the other pair of screen strips. In such case the current flows from the screen strip 23 to the screen strip 26 through the wire 178 and contacts 10 and 1 on the rotary switch 124c, wire 179 to the vibrator reed 174. The vibrator is also started up when the door falls and closes the microswitch 34. In such case the current travels through the female plug 171f to the wire 171b to one side of the coil 171. To reach the other side of the coil the current goes through the wire 171c to the junction 209, contacts 1 and 10 on the rotary switch 124e through the wire 220 to the junction 219 through the wire 227 and through the microswitch 34 to the contact 228. When the current flows through the wire 229 through the contacts 7 and 12 on the rotary switch 124c to the junction 230 and then to the wire 179 to the contact of the vibrating reed. This contact 174 on the vibrating reed is normally in contact with the stationary contact 173 and sends the voltage through the junction 172, wire 172a to the other end of the coil 171. This coil contains a core that is magnetized and demagnetized as the current is established in the coil and broken by the movement of the vibrator reed. The reed is long enough so that it can vibrate about 220 cycles per second or 110 cycles per second.

This vibrator is a stock piece of apparatus that is made by a number of manufacturers, the product of any one of which will answer the purpose.

At this point in the operation of the trap the rat has traveled up the incline shown in Figures 4 and 5 and has moved sideways and reached that part of the trap that is shown in the upper right hand corner of Figure 6 and he has located himself on the level runway 50. He is then attracted by the light 52 and the wire screen 51 which admits light from the outside of the trap. He is attracted by the light and travels toward it, being probably led to believe that it is a way out of the trap. In traveling to the left at the top of Figure 6, he passes the door 53 which up to that is held in its low position shown in Figure 6 and raches the ten plates 54, 54 etc. shown at the upper right hand corner of Figure 10 and at the lower left hand corner of Figure 1. These plates are on the trap door 76. Up to this point these plates are on open circuit. As heretofore pointed out, eight of these plates are stationary and two of them indicated at 54a are hinged. When the animal or rat steps on either of these plates 54a he presses them down and closes the circut through the wire 231 which leads to the solenoid 56 which energizes this olenoid 56 drawing the core thereof and permitting the door 53 to be raised by the spring 59. This shuts the animal in the chamber 61. The circuit through the solenoid is completed on one side through the wire 223, junction 224, wire 225 to the junction 182 and junction 181, wire 180 to the female plug 171f.

From either of the trap doors 54a the circuit is completed on the other side through the wire 232 through the microswitch 66 shown in Figure 9 which is held closed when the door 53 in Figure 6 is down. The current travels through the wire 233 to the junction 219 through the wire 220 and the contacts 10 and 1 on the rotary switch 124e and from there to the junction 209 and wire 171c to the female part 171f of the plug as heretofore described. As long as the microswitch 66 remains in the position shown in Figure 10 the solenoid 56 will continue to be energized which is objectionable. When the door 53 rises, the microswitches 65 and 66 move up from the position shown in Figure 10 and make contact with the upper contacts shown in connection with each switch. When the microswitch 66 moves from the lower contact to the upper contact shown in Figure 10 it opens the one circuit and closes the other circuit with an effect that will presently be described. Microswitch 65 then causes the current that is flowing through wire 233 to flow through the wire 235 and through the junction 236 and through the wire 237 and wire 238 and to the motor 40 and through wire 239 to the junction 240 to the vibrating reed 241 of the vibrator 143. The vibrating reed is operated by the coil 144 with its magnetic core as heretofore described. From the junction 240 the current also flows to the condenser 192, which causes the vibrator to operate without a spark on the contacts it being understood that the vibrator 143 changes a D. C. of 6 volts and 20 amps. to an A. C. and therefore a condenser is necessary while the vibrator 146a converts a small current of 6 volts and 1 amp. which makes a condenser unnecessary. With the vibrator 143 in operation an alternating current is produced. This flows from the stationary contact 143a through the wire 242 through the contacts 4 and 11 on the rotary switch 124f, through the wire 243 to the primary coil of the transformer 145. This transformer changes the current from 6-volt to 110-volt A. C. From the primary coil of the transformer 145, the current flows through the junction 197 through the wire 196 to the junction 194 and then through the wire 195 through the contacts 1 and 10 on rotary switch 124d and wire 193 to the junction 191 and then to the stationary contact 143b of the vibrator 143. It also flows to the other side of the condenser 192. From the center of the primary coil of the transformer 145, the wire goes through the fuse 149, wire 185 through the contacts 7 and 12 on the rotary switch 124e and then the junction 184 and then through the wire 186 to the junction 187 to the coil 144 which energizes the vibrator 143. These connections cause the vibrator to vibrate as long as door 53 is up, it being understood that the door 53, when it raises causes the microswitch 65 to change from the lower contact to the upper contact shown in Figure 10. This starts the vibrator 143 to vibrating and changes the 6-volt D. C. to A. C. This current goes to the transformer 145 and steps up the current to 110 volts A. C. 60 cycle. Through the wire 244 this A. C. is fed to the motor 40 at contact 108a and on the completion of the circuit causes it to turn and causes it to rotate the cam 43 shown in Figure 2.

The circuit through the motor is completed through the wire 246 through the fuse 247, junction 248 to the contacts 7 and 12 on the rotary switch 124b and thence through the wire 237 through the wire 238 to the contact 108 on the other side of the motor. This completes the circuit and causes the motor to rotate and rotates the cam 43 shown in Figure 2 through the wire 248 and through the microswitch 74a to the junction 249 through the wire 250 to the on and off switch 65c to the upper side of the primary coil of the transformer 65a. This charges the ten hot plates 54, 54 with 400 volts with about ¾ amp., which is sufficient to kill a rat in about fifteen seconds. The lower side of the circuit from the primary side of the coil 65a has heretofore been described; namely, the current flows through the wire 245 to the contact 108a and wire 244 to the lower side of the secondary coil of the transformer 145 in Figure 10a. With the motor in operation the doors 7g and 8g are being raised. As the door 8g raises it closes the microswitch 68 long enough to energize the solenoid 69 which withdraws the core 70 and releases the trap door 76 carrying the ten hot plates, which releasing mechanism is shown in the upper right hand corner of Figure 5 and has heretofore been described. This permits trap door 76 to fall down and discharges the dead rat from the trap.

The five solenoids shown at the top of Figure 10 are all energized on one side through the wire 223. On the other side each solenoid is operated through a separate wire or a set of wires. The solenoid 69 is energized on one side by the wire 223 and on the other side through the wire 251, switch 68, junction 249, switch 74a, wire 248 through the switch 66, junction 233a and wire 233, junction 219, wire 220 through the contacts 10 and 1 on the rotary switch 124e through the junction 209, wire 171c to the female side of the plug 171f. This completes the circuit through the solenoid 69 which lets the trap door 76 drop. When the trap door drops the arm 75 on the door raises and opens the microswitch 74a which shuts the voltage off of the hot plates on the trap door 76. See Figure 10.

As the motor turns with the cam 43 it raises the doors 7g and 8g so they are locked in their raised position by the solenoids 12g and 13. It also raises the door 31 until it is locked by the solenoid 29. It also pushes down the door 53 until it is locked by the solenoid 56. This restores the microswitches 66 and 65 to the position shown in Figure 10. When microswitch 65 opens it shuts off the current that drives the motor, but the motor continues to operate because of the switch on the big gear that has heretofore been described. The current is carried to the gear switch 107 by the wire 218. When the contact 104 on the gear switch reaches the insulated part of the ring with which it must contact, the circuit is broken and the motor stops rotating. Just before the motor stops operating the trap door 76 has been raised to the level of the runway of which it forms a part by mechanism heretofore described. The vibrators also stop vibrating and the trap is completely reset and there is no current flowing into any part of the trap from the 6-volt battery. This protects the battery and gives it long life.

So far the operation has been described when the trap is operated by a 6-volt battery.

The operation of the trap will now be described when it is operated by a 110 volt D. C. or 110 volt A. C. 25 cycle. For this purpose the rotary switch is set on the intermediate position in which each blade or rotary arm connects the contacts 11 with the contact 5. Another blade connects contact 12 with contact 8 and the third blade connects contact 10 with contact 2. All of the six rotary switches are set alike in this respect and are operated with 110 volt D. C.

In all cases where the trap is operated with other than 6-volt current, the current comes in at the terminals 120 and 121 shown at the right in Figure 10.

As heretofore described when the rat enters the trap, the wave wall unit energizes the solenoid switch 130 and draws the armature 131 closing the circuit between the terminals, and contacts 132 and 132a which are shown at the upper right hand corner of Figure 14. From the contact 132 extends the wire 201 to the solenoid switch 202 shown at the lower right hand corner of Figure 10. From the solenoid switch 202 on the right hand side the current flows through the wire 201a, junction 203, wire 204, contacts 12 and 8 on the rotary switch 124d and down through the wire 252 through the resistor 151 and through the wire 253 through the contacts 5 and 11 on rotary switch 124b through the wire 254 to the terminal 120.

The resistor 151 reduces the voltage from 110 volts preferably to 8 volts D. C. This resistor can be variable from 0 to 110 volts so as to change the voltage to any amount desired, from 110 to any intermediate point from 2 up.

From the solenoid switch 202 on the left hand side the current flows through the wire 201a to the terminal contact 132. From 132 the current flows through the solenoid switch to the contact 132a by which the circuit is closed at this point. From the terminal 132a the current flows through the wire 213 to the microswitches 38 and 37 through the switches to the wire 211 to the contact 11 on rotary switch 124d. From there it flows to the contact 5 on the rotary switch 124d and then through the wire 255 through the contacts 5 and 11 on the rotary switch 124c to the wire 256 to the terminal 121. This circuit energizes the solenoid switch 202 and its core which closes the contacts 215 and 216.

When the solenoid switch closes at 215 and 216 the current flows through the wire 221 to the junction 222 which energizes the solenoids 12g and 13 on one side. From the other side of the solenoids 12g and 13 the current flows through the wire 223 to the junction 224 and to the left on wire 225 and down to junction 102 and from there it flows through the stationary contacts 10 and 2 on rotary switch 124f and from there on wire 257 through the resistor 152 to the junction 258 and up on the wire 253 to the stationary contacts 5 and 11 on rotary switch 124b and then on the wire 254 and on through to the upper terminal 120 of the 110 volt D. C. plug. The resistor 152 is a variable resistance and reduces the voltage preferably from 110 volts to 12 volts. From the other side of the solenoid switch the current flows through the wire 216 through the microswitch 9a through the thermostat blade 36 through the junction 217 and up through the wire 218 and through the wire 233 to the junction 219 and from there through the wire 220 through the stationary contacts 10 and 2 of the rotary switch 124e and then through the wire 259 to the junction 260 to the wire 255 and through the contacts 5 and 11 on the rotary switch 124c and then through the wire 256 to the terminal on the lower side of the plug at 121.

This energizes the solenoids 12g and 13 and drops the doors 7g and 8g at the ends of the tunnel. The rat now goes through the small opening 17 and gets on the runway 21 and as soon as he gets on the trap door 27 he closes the microswitch 32 and energizes the solenoid 29 which lets the door 31 drop and closes the opening 17 behind him.

As previously pointed out all the solenoids 12g, 13, 29, 56 and 69 are energized on one side through the wire 223 from the upper side of the plug 120, 121 shown on the right hand side of Figure 10. The solenoid 29 is energized on the other side through the wire 226 and microswitch 32 energized by the trap door in the ramp and through the microswitch 34, wire 227, junction 219, wire 220 through the contacts 10 and 2 on rotary switch 124e and through the wire 259, junction 260, wire 255 to the contacts 5 and 11 on the rotary switch 124c and through the wire 256 to the lower side 121 of the plug.

The screen on the runway 21 is energized as follows: The microswitch 33 is normally held open as long as the door 31 remains up. As soon as the door 31 drops, this switch automatically closes and the four screen strips 23-26 inclusive are energized as follows. The screens 24 and 26 are connected by the wire 178 to the contacts 10 and 2 on the rotary switch 124c. From the contact 2 current flows through the wire 261 to the junction 262, wire 254 to the upper terminal of the plug 120. On the other side, the screen strips 23 and 25 are connected to the microswitch 33, wire 176 to the contacts 10 and 2 on the rotary switch 124b. The current then flows through the resistor 263 to the wire 264 and to the lower terminal 121 of the plug. It will be understood that the circuit is completed through the body of the animal, and the current tickles his feet and urges him up the runway. Resistor 263 is a fixed resistance of several thousand ohms.

So far the rat has traveled up the ramp and got on the upper deck and has turned toward the light 52 and the screen opening adjacent to it. He runs toward the light and passes over the sliding door 53. He touches on the swinging plates 54a and by depressing either one of them he closes the circuit that energizes solenoid 56. As above described all the five solenoids are energized on one side through the wire 223. On the other side, the solenoid 56 is energized through the wire 231, the plates 54a, wire 232, microswitch 66, junction 233a, wire 233 to the junction 219 and through the wire 220 through the contacts 10 and 2 of the rotary switch 124e and through the wire 259, junction 260, wire 255 to the contacts 5 and 11 on microswitch 124c, then through the wire 256 to the lower terminal 121 of the plug. This permits the door 53 to rise behind the rat and lock him in. When the door goes up the microswitches 65 and 66 shown in Figure 6 are permitted to close. When these switches close the vibrator 143 shown at the lower left hand corner of Figure 10a is set in motion as follows. The current flows from the lower contact 121 of the plug up through the wire 256 to the contacts 11 and 5 of the rotary switch 124c, then down through the wire 255 through the junction 260, wire 256 and through the contacts 2 and 10 of the rotary switch 124e through the wire 220 up to the junction 219 and then to the right through the wire 233 to the microswitch 65 and then down through the wire 235 to the junction 236 and then to the right through the wire 237 and down through the wire 238 to the motor contact 108 and then through the wire 239 at the bottom of Figure 10a through the junction 240 where it energizes the vibrating reed 241. The contact 143a is energized through the wire 242 through a junction to the stationary contacts 8 and 12 of the rotary switch 124f and then down through the wire 265 to the primary side of the transformer 146 and thence through the wire 266 to the stationary contacts 12 and 8 on the rotary switch 124a and then through the wire 267 down to the contacts 2 and 10 of the rotary switch 124d and through the wire 193 to the junction 189 to one side of the electromagnet coil 144 and also down through the wire 190 to the junction 191 to the stationary contact 143b of the vibrator 143 and from the junction 191 to one side of the condenser 192.

From the middle of the primary coil of the transformer 146 a wire 268 leads up to the contacts 5 and 11 of the rotary switch 124e and then through the wire 269 to a junction and then to the left to a junction, then up through the wire 253 to the contacts 5 and 11 of the rotary switch 124b, then up through the wire 254 and then to the right to the terminal 120 of the plug.

The current also flows from the wire 269 which leads up from the rotary switch 124e to the selenium rectifier 153 and then down through a wire to the contacts 8 and 12 of the rotary switch 124e to the junction 184 and then to the left and down through the wire 186 through the junction 187 to one side of the condenser 155 and also on to the coil of the electromagnet 144. This operates the vibrator and converts the 110 D. C. into the 110 A. C. that operates the primary side of the step down transformer 146. This vibrator 143 is also used if the trap is run by 110 volt A. C., 25 cycle in which case it is used to change the 25 cycle to 60 cycles. It is not used when the trap is operated by 110 volt, 60 cycle. It will be understood that the transformer 146 is always used as a step down transformer for converting 110 volts to 6 volts A. C. 60 cycle and is always idle when 6 volts is used to operate the trap.

Transformer 145 is operated with all the voltages and in some cases is used as a step up transformer and in other cases it is used as a step down transformer.

As heretofore stated the lamp 18 is located in the left hand end of the passage over the ramp as indicated at the left hand side of Figure 1 and the lamp 52 is located at the left of the runway 50. Both of these lamps are energized when the doors 7g and 8g drop. These lamps are energized as follows. When the doors 7g and 8g drop the door 7g releases the microswitch 37 which moves from the upper contact to the lower contact shown at the right in Figure 10a and the door 8g releases the microswitch 38 which moves from the upper contact to the lower contact as shown at the right in Figure 10a. Both of these switches operate on the same circuit. The current flows down through either or both switches to the wire 211a. From the wire 211a to the left in Figure 10a and up to the circuit that feeds the lamps 18 and 52 which are in parallel on that circuit. On the opposite side of the lamp circuit the current flows through a wire 270 through a resistor 271 through the contacts 11 and 4 on the rotary switch 124a and through the resistor 272 down through a wire 273 to a junction 274 and then up through the wire 253 and through the contacts 5 and 11 on the rotary switch 124b and then through the wire 254 to the upper terminal 120 of the plug. On the opposite side of the microswitches 37 and 38 the current flows up through the wire 211 to the contacts 11 and 5 on the rotary switch 124a and then through the wire 255 through the contacts 5 and 11 of the rotary switch 124c and then through the wire 256 to the lower terminal 121 of the plug. In this way the two lamps are energized when the doors 7g and 8g drop. The resistor 271 has a constant resistance and is always in circuit. The resistor 272 has a variable resistance and is used only when 110 D. C. is used and when 110 volt A. C., 25 cycle is used, otherwise this resistor 272 is cut out by the position of the rotary switches above described.

As above described the transformer 146 steps down the 110 A. C. current to the 6 volt A. C. current 60 cycles and the 6 volt A. C. current is fed to the transformer 145 as follows. The 6 volt current on one side of the secondary of transformer 146 passes through the junction 197 direct to corresponding side of the transformer 145. The current from the secondary side of the transformer 146 flows through the wire 198, junction 199, wire 200 through the contacts 5 and 11 of the rotary switch 124f and then through the wire 243 to the other side of the 6 volt side of the transformer 145. The transformer 145 steps the current up from the 6 volt to 110 volt, 60 cycle and the current is fed through the wire 246 up to the fuse 247, junction 248 and then to the contacts 12 and 8 of the rotary switch 124b and through the wire 237 to the junction 236 and up to the microswitch 65 down to a junction and a wire 233 and then to the right to the junction 233a up to the microswitch 66 and through the switch to the wire 248 to the microswitch 74a to the junction 249 and wire 250 to the on and off switch 65c and then to the 110 volt side of the step up transformer 65a, which transformer steps the 110 volt current up to 400 volts when the circuit is complete. The circuit is complete through the wire 245 which goes down through the contact 108a on the motor and through the wire 244 to the opposite side of the coil in the transformer. This also energizes the motor 40. The transformer 65a energizes the ten hot plates on the trap door with 400 volts and ¾ ampere as above described.

From this point the mechanical operation of the parts of the trap are the same as heretofore described. The foregoing describes the operation of the trap when it is operated by 110 volt 25 cycle A. C. or 110 volt D. C.

The operation of the trap will be described when it is operated by 110 volt, 60 cycle A. C. current.

The rotary switch will be set on the third position turning it clockwise from the position shown in Figure 10 and from this position the stationary contact 11 in each of the six rotary switches will be directly connected to the contact 6. The contact 12 will be directly connected to the contact 9 and the contact 10 will be directly connected to the contact 3. The power comes in at the plug 120 and 121. In the third position of the rotary switches the primaries of the transformers 145 and 146 are in parallel and the secondaries are in series. The primary of each transformer is indicated by showing six turns in the coil. The secondary of each transformer is shown by three turns in the coil.

In the third position of the rotary switches the primaries of the transformers 145 and 146 are in parallel and the secondaries are in series. This causes the two secondaries to produce together a current of 12 volts by which the five solenoids are operated, it being understood that 12 amperes is furnished with each solenoid for the purpose of operating.

The transformers 145 and 146 are energized all the time from the plug 120, 121 when the trap is operated by 110 A. C. current. The primaries of the two transformers 146 and 145 are energized all the time the current flows from the terminal 120 to the wire 254 through the contacts 11 and 6 in the rotary switch 124b and then to the junction 248 through the fuse 247, wire 246 to one side of the primary of the transformer 145 and then through the wire 244 through the contact 108a at the motor, wire 245 through the contacts 6 and 11 on the rotary switch 124c and then through the wire 256 to the terminal 121 of the plug. The current can also flow from the contact of the switch 124c down through the wire 245 through the contacts 9 and 12 of the rotary switch 124f and through the wire 265 to the primary of the transformer 146.

The current flows through the primary side of the transformer 146 and up through the wire 266 and through the contacts 12 and 9 of the rotary switch 124a and then up through the wire 220 to the junction 219 and through the wire 233 and then down through the contacts 9 and 12 of the rotary switch 124b and then through the junction 248 and fuse 247, wire 246 down to the primary side of the transformer 145.

The balance of the circuit back to the plug 120, 121 has been described above.

The terminals 132 and 132a are energized from the secondary of the transformer 145 as follows:

The current flows from the secondary of the transformer 145 to the junction 197 through the wire 196 through the junction 194 and through the contacts 6 and 11 of the rotary switch 124d and then through the wire 211 through the microswitches 38 and 37 and down through the wire 213 to the terminal 132a and through the solenoid switch 130 at the upper right hand corner of Figure 14 and through the contact 132 and through the wire 201 to the solenoid switch 202 and out of the solenoid to the wire 201a, through the wire 204 through the contacts 12 and 9 of the rotary switch 124d to the junction 206 and down through the wire 207 to the junction 181 thence to the junction 182, wire 225 to the junction 224 and down through the contacts 6 and 11 of the rotary switch 124f and then through the wire 243 back to the secondary side of the transformer 145.

When the solenoid 202 is energized it closes the solenoid switch 215 and sends the current through the wire 221 to the solenoids 12g and 13 and the current comes back through the wire 223 and through the contacts 6 and 11 on the rotary switch 124f and through the wire 243 to the secondary of the transformer 145. When the solenoid switch 202 is energized the current can flow up through the wire 216 through the microswitch 9a through the thermostat blade 36 up to the junction 217 through the wire 218 to the junction 219 and through the wire 220 to the contacts 10 and 3 of the rotary switch 124e to the upper side of the secondary of the transformer 146. This causes the solenoids 12g and 13 to operate and release the doors 7g and 8g which drop and close the entrance to the tunnel. When the doors 7g and 8g drop the microswitches 37 and 38 close and turn on the lamps 18 and 52. This is done as follows. From the lamps 18 and 52 on one side the current flows through the wire 270, resistor 271 through the contacts 11 and 6 on the rotary switch 124A up to the wire 223 and then down through the contacts 6 and 11 on the rotary switch 124f and then through the wire 243 to the secondary of the transformer 145 and through the secondary to the junction 197, wire 196 to the contacts 6 and 11 of the rotary switch 124d and then through the wire 211 to the microswitches 38 and 37 and through them, through the wire 211a up to the other side of the lamps 18 and 52. The rat is attracted by the light and goes through the opening 17 and up the ramp shown in Figures 4 and 5. The rat presses on the door 27 and closes the microswitch 32 which energizes the solenoid 29 which releases the door 31 shown in Figure 4 and encloses the rat on the runway.

The solenoid 29 is energized as follows: On the one side through the wire 223 which is connected as above described to the secondary of the transformer 145. On the other side the current flows from the solenoid 29 through the wire 226 and through the microswitches 32 and 34 and through the wire 227 to the junction 219 and through the wire 220 to the contacts 10 and 3 of the rotary switch 124e to the secondary of the transformer 146, it being understood that the secondary of transformer 145 and 146 is connected to the wire that passes through the wire 197a that passes through the junction 197.

This causes the door 31 to fall behind the rat so that he must go up the runway. The falling of the door closes the microswitch 33 which energizes the strips of screen 23, 24, 25 and 26 shown at the upper left hand corner of Figure 10.

When the door 31 drops it closes the microswitch 33 which energizes the four strips of screen shown at the upper left hand corner of Figure 10. This tickles the rat's feet and urges him up the ramp. At the top of the ramp he turns toward the lamps and the screen opening and gets on the trap door that has the ten metal plates shown at the upper right hand corner of Figure 10. He is induced to this because he thinks that the lamps indicate a way out of the trap. As soon as he gets on the trap door he presses down the two hinged plates 54a and closes the circuit that energizes the solenoid 56. In this circuit the current flows through the wire 231 through one side of the solenoid and down through the wire 223 as heretofore described through the secondary of the transformer 145. From the other side of the hinged plates 54a the current goes through the wire 232 through the microswitch 66 junction 233a through the wire 233 through the junction 219 and down through the wire 220 and through the contacts 10 and 3 of the rotary switch 124e and then through the wire 198 to the secondary of the transformer 146. This releases the door 53 in Figure 6 which rises and encloses the rat on the trap door.

When the door 53 raises it releases the microswitches 65 and 66 so that both swing up from the position shown in Figure 10. As the door 53 has gone up the movement of the microswitch 66 leaves the solenoid 56 on open circuit, but this does no harm as the door is up. The microswitch 66, when it goes up, charges the ten plates on the trap through the circuits as follows: The current flows from the microswitch 66 up through the wire 248 through the microswitch 74a through the junction 249, wire 250 to the on and off switch 65c to the step up transformer 65a which furnishes 400 volts to the 10 plates on the trap door. From the microswitch 66 the current flows down to the junction 233a and through the wire 233 and through the contacts 9 and 12 on the rotary switch 124b and then through the junction 248 to the contacts 6 and 11 of the rotary switch 124b and up through the wire 254 to the plug 120, 121. From the low side of the transformer 65a the current flows through the wire 245 through the junction 245a and through the contacts 6 and 11 on the rotary switch 124c and then through the wire 256 to the low side of the plug 120, 121. When the microswitch 65 closes the current flows through the wire 235, junction 236, wire 237, 238 to the contact 108 on the motor and then through the contact 108a through the wire 245 to the junction 245a and then through the contacts 6 and 11 of the rotary switch 124c and through the wire 256 to the lower terminal in the plug 120, 121.

The low side of the microswitch 65 connects to the wire 233 from which the current flows through the contacts 9 and 12 of the rotary switch 124b then to the junction 248 and through the contacts 6 and 11 of the rotary switch 124b and then through the wire 254 to the upper side of the plug 120, 121. This causes the motor to operate, which raises the door 8g and closes the switch 68, which energizes the solenoid 69 which permits the trap door to drop and ejects the dead rat. From the time the ten plates are energized until the trap door drops a period of fifteen seconds elapses which is sufficient for the current of 400 volts to kill the rat; so that the rat is dead when the trap door drops and the dead rat is ejected from the trap. The motor continues to operate to reset all the parts of the trap and then the current goes off, except that the current continues to energize the two transformers 145 and 146.

The various elements of the trap are energized or set in motion by the so-called wave wall unit which will now be described.

In this wave wall unit are two oscillator circuits 301 and 302. In the circuit 301 there is a resistor 303, a coil 304, a fixed condenser 305 and a variable condenser 306. In series with these elements is a radio tube 307 which is a small size tube ordinarily known to the trade as a 1-G-4 tube. This tube has a plate and a filament, with a grid between them such as is found in all ordinary radio tubes. The filament is lighted by a 6 volt circuit and the filament of any one tube is energized by a volt and a half, it being understood that filaments of four tubes 307, 308, 309, 310 are arranged in series and are collectively energized by the 6 volt circuit. Only the filaments of the four tubes are energized by the 6 volt battery. All the other elements of the four tubes are energized by the B batteries 147 and 148.

The 6 volt current flows through the wire 311 to the filament of the tube 310 and then to the junction 312 and then through the wire 313 to the filament of the tube 308 and from the filament of the tube 308 to the wire 314 and to the filament of the tube 309 and to the wire 315 to the tube 307 and then to the ground 316. It will also be understood that the other side of the battery is grounded at 317 and 318.

Two B batteries of 45 volts each are provided at 147 and 148. These are connected in series and together with a voltage of 90 volts. With the rotary switch set on the first position the switch 124a connects the contacts 1 and 10 which contacts are shown at the bottom of Figure 14. These contacts are connected to the battery by the wire 319 and the current flows through the contacts 1 and 10 through the wire 320 through the junction 321 to the solenoid 130 and from the solenoid 130 to the wire 322 to the plate 323. The 90 volts of the B battery impresses about 85 volts on the plate 323, it being understood that about 5 volts of the 90 is absorbed by the solenoid 130.

The foregoing description is special to the operation of the wave wall unit of the trap by the 6-volt battery current. The remainder of the description is common to the operation of the wave wall unit of the trap by each of the electrical sources of energy heretofore described.

The wave wall unit includes in its combination three variable condensers; namely, 306, 351 and 352. These condensers are rated as follows:

|  | Mmfd. |
|---|---|
| 306 | 75 |
| 351 | 100 |
| 352 | 75 | it being understood that these characters indicate micromicrofarads, a well-known electrical term by which the capacity of condensers is indicated. It also includes twenty-three fixed condensers as follows:

| 305 | Fixed condenser | 100 mmfd. mica [1] |
|---|---|---|
| 327 | Fixed condenser | .1 mfd. |
| 330 | Fixed condenser | .1 mfd. |
| 343 | Fixed condenser | 100 mmfd. mica |
| 345 | Fixed condenser | .001 mfd. |
| 346 | Fixed condenser | 150 mmfd. mica |
| 347 | Fixed condenser | .001 mfd. |
| 348 | Fixed condenser | .02 mfd. |
| 349 | Fixed condenser | .02 mfd. |
| 350 | Fixed condenser | 200 mmfd. mica |
| 353 | Fixed condenser | 200 mmfd. mica |
| 354 | Fixed condenser | .05 mfd. |
| 355 | Fixed condenser | .05 mfd. |
| 356 | Fixed condenser | 40 mfd., 150 volts |
| 357 | Fixed condenser | 20 mfd., 150 volts |
| 358 | Fixed condenser | 200 mfd., 10 volts |
| 359 | Fixed condenser | 20 mfd., 150 volts |
| 360 | Fixed condenser | .001 mfd. |
| 361 | Fixed condenser | .001 mfd. |
| 362 | Fixed condenser | .001 mfd. |
| 363 | Fixed condenser | .1 mfd. |
| 364 | Fixed condenser | .1 mfd. |
| 365 | Fixed condenser | .1 mfd. |

[1] Mica meaning mica insulation. Otherwise the insulation is paper.

It also includes a variable resistor 326 having a resistance of 1.5 megohms. It also includes thirteen fixed resistors as follows:

| 303 | Fixed resistor | ohms | 5,000 |
|---|---|---|---|
| 331 | Fixed resistor | megohms | 1 |
| 333 | Fixed resistor | ohms | 50,000 |
| 336 | Fixed resistor | do | 50,000 |
| 339 | Fixed resistor | do | 5,000 |
| 366 | Fixed resistor | do | 500,000 |
| 367 | Fixed resistor | do | 500,000 |
| 368 | Fixed resistor | megohms | 2 |
| 369 | Fixed resistor | do | 2 |
| 370 | Fixed resistor | do | 1 |
| 371 | Fixed resistor | ohms | 30 |
| 372 | Fixed resistor | do | 2,000 |
| 373 | Fixed resistor | do | 2,000 |

It also includes four radio frequency or self-induction coils as follows:

304 is rated at 30 millihenrys
340
341
342

It also includes a radio frequency choke coil 342a which is rated at 15 millihenrys.

It also includes a selenium rectifier 375 having a rating of 100 milliamperes.

Two condensers are shown above the tube 310 and one of these condensers on the upper side is directly connected to the junction 321 which has the pressure of 90 volts thereon. The other condenser on the upper side is connected to the wire 322 and has about 85 volts impressed thereon. The lower side of each of these condensers is grounded as shown in Figure 14. From the junction 321 leads the wire 324 which is grounded at 325 and in this wire is inserted a resistance 326 of one and one-half megohms. This resistance is a variable resistance.

In the tube 310 are three grids. The top grid is a suppressor. That is, it keeps the tube from setting up oscillations that would feed back. The second grid is a screen grid and the third grid is a control grid.

Voltage is impressed through the variable resistance 326 on the screen grid from the B battery. On the top grid of tube 310 a voltage of 1½ volts is directly impressed from the 6 volt battery through the filament of the tube 310 and the junction 312. On this circuit is the condenser 327, the lower side of which is grounded at 328. The lowest grid of the three grids of the tube 310 is connected by the wire 329 to the low side of the condenser 330 through the resistor 331 through a junction to a small diode in the tube 310. This tube 310 is a stock tube and is known to the trade as 1-S-5. The voltage is impressed on the third grid of tube 310 and will presently be described.

The tube 309 has a plate and five grids and a filament therein. The five grids are numbered from the top down. The first or top grid is a suppressor grid. The second and fourth grids are screen grids and the third and fifth grids are control grids. This tube 309 is a stock tube and is known to the trade as 1-R-5. The tubes 307 and 308 are alike and are known to the trade as 1-G-4. The tubes 307 and 308 are very large tubes and the tubes 309 and 310 are very small tubes.

The tube 309 is energized as follows: The current flows from the 6 volt terminal through the wire 311 to the filament at the bottom of the tube 310 and thence through the junction 312 through the wire 313 through the filament of tube 308 and thence through the wire 314 through the filament in the tube 309 and then down through the wire 315 to a junction and then up to the filament of the tube 307 and then to the ground 316.

The current flows through the filament at the bottom of tube 309 up to the top grid and impresses 1½ volts on the top grid. The current flows from the B battery through the wire 329 to the junction 332 and then up to the resistor 333 to the junction 334 and then to a junction in the tube 309 to the second and fourth grids in the tube which are the screen grids.

How the current gets into the third and fifth grids will be explained later on.

The plate of the tube 309 is energized as follows: The 90 volt current flows from the B batteries 147 and 148 through the wire 319 and from the contacts 1 and 10 of the rotary switch 124a through the junction 332 on the wire 320 and then up to the junction 321 and further up and over to the junction 335 and then down through the resistor 336 to the plate in the tube 309. The resistor 336 has a resistance of 5000 ohms.

The tube 308 has a plate at the top, a control grid in the middle and a filament at the bottom. This tube 308 is energized by the B battery current which flows from the junction 335 above described through the wire 337 to the junction 338 through the resistor 339 to the coil 340 and thence to the plate.

The resistor 339 has a resistance of about 5000 ohms. The tube 307 has a plate at the top, a control grid in the middle and a filament at the bottom. The B battery current is impressed on the plate in this tube from the junction 338, the resistor 303, through the coil 304 which is connected to the plate.

The circuit in which the tube 307 is connected has a fixed resistor 303. In series with this resistor is a combination as follows. Namely, a radio frequency or self-induction coil 304. Parallel with this is a fixed condenser 305 and a variable condenser 306 which condensers are parallel to each other. The coil 304 gets up a frequency of from 70,000 to 80,000 cycles per second. The fixed condenser 305 and the variable condenser 306 increases or decreases this frequency so that the combination will give a frequency of 80,000 cycles per second, the exact tuning to secure this result being done by this variable condenser.

These three elements, the induction coil 304, the fixed condenser 305 and the variable condenser 306 while parallel with each other are in series with the condenser 348 and the ground shown in connection therewith. They are also in series through the condenser 345 and through the wire 302a with the middle control grid of the tube 309 and the resistor 368 which is in series with the filament of the tube 309 and the suppressor grid of the tube 309. This combination is in series with the plate of the tube 307.

The grid of the tube 307 is connected to the resistor 366 and to one side of the condenser 350. The other side of the condenser 350 is connected to the wire 11g which wire is shown in Figures 2 and 3. With the condenser 350 and the resistor 366 is connected the induction coil 341 which is in shunt with both the resistor 366 and the variable condenser 351. These three elements 341, 351 and 366 are also connected to the filament of the tube 307 and to the ground 316. The combination connected with the grid oscillates with a frequency of about 80,000 cycles per second, substantially the same as the combination connected to the plate; namely 80,000 cycles per second. The filament of the tube 307 is connected to the condenser 355 which acts as a filter to stop out any A. C. components or undulations in the D. C. circuit.

The tube 308 is in circuit with the resistor 339 and a combination of the induction coil 340, the condenser 346 and the condenser 349 and these in turn are in series with the tube 308.

The induction coil 340 and the condenser 346 are in parallel with each other and are in series with the condenser 349, the opposite side of which is grounded.

The grid of the tube 308 is connected with the condenser 353 and the resistor 367. On the opposite side of the condenser 353 is the induction coil 342, the variable condenser 352 and the fixed condenser 343. These three elements are in parallel with each other and at the lower end they are connected to the ground. The lower end of the resistor 367 is connected to the filament of the tube 308 and the filament is in series with the filament of the tube 310.

Each of the tubes 307 and 308 and the foregoing elements with which they are combined produce the oscillations of 80,000 cycles per second.

As long as these oscillations remain uniform and are not disturbed the solenoid 130 will not operate, but when an animal enters the tunnel it disturbs the frequency of the oscillations controlled by the tube 307 and reduces them without disturbing the frequencies emanating from the tube 308. Both of the frequencies are fed into the grids of the tube 309. The frequencies from the tube 307 pass through or across the condenser 345 and into the middle or control grid of the tube 309 and the frequencies emanating from the tube 308 pass through or across the condenser 347 into the lowest control grid in the tube 309.

The oscillations on the one grid cancels out a corresponding number of oscillations on the other grid, and the excess oscillations in the tube 309 are impressed as low frequency oscillations on the plate of the tube 309, and these low oscillations are streamlined into a pure sine wave by passing them through the following elements; namely, the choke coil 342a, the condenser 362 to the diode in the tube 310. The choke coil 342a stops out any high frequency waves and allows the low frequency waves to go through the condenser 363.

The condensers 361 and 363 also help to stop out any high frequency waves and send them to the ground that is shown between the two tubes 309 and 310 which ground is connected to the condensers by the three junction points shown immediately below the two condensers and the choke coil. Between the diode and the wire that leads to the condenser 360 a resistor 370 is interposed for the purpose of keeping the frequency constant.

The diode in the tube 310 rectifies the sine waves by cutting one half of them. The voltage of these sine waves is applied to the control grid shown at the bottom of the tube 310 by passing through the resistor 331 and the wire 329. In so doing it increases the current that flows from the plate 323 through the solenoid 130 sufficiently to cause the solenoid to operate and close the switch and that starts the sequence of operations in the trap.

The foregoing completes the explanation of the operation of the wave wall unit when it is energized by 6 volt D. C.

The operation of the wave wall unit by 110 volt D. C. or the 110 volt A. C. current, 25 cycle current will now be described.

The current flows in at the terminal 121a and out at the terminal 121b or vice versa. The rotary switch 124a which heretofore has been set to connect the contact 10 with the contact 1 is now turned so that it connects the contact 10 with the contact 2. This cuts out the B batteries 147 and 148.

The current flows from the contact 121b through the resistor 371. This resistor acts as a fuse for the selenium rectifier 375 and protects the selenium rectifier 375 from being burned out if a short circuit has occurred elsewhere in the wave wall unit. The current also flows through the resistor 373 and through the contacts 2 and 10 through the wire 329 as shown in Figure 14 as heretofore described and the current goes through the junction 321 and then to the solenoid 130 and out of the solenoid on the wire 322 to the plate 323 of the tube 310. It also goes up from the junction 321 and across through the junction 335 energizing the various circuits and elements as heretofore described, except as to the filaments of the tubes. These filaments are now energized as follows:

The current goes from the contact 121b to the junction 380 and then up through the resistor 372 and then across and down to the junction 381 and up through the wire 382 to the filament of the tube 310 and from there to the filaments of the other tubes as heretofore described and in the same order, otherwise the operation of the elements of the wave wall unit is the same as heretofore described, omitting that part of the description that is special to the operation of the wave wall unit by 6-volts.

The resistor 372 has a resistance of 2000 ohms and reduces the voltage so that at no time the filaments of the tubes could be burned out.

The operation of the wave wall unit by 110 alternating current, 60 cycle current will now be described.

The rotary switch 124a is set to connect the contact 10 with the contact 3.

When the wave wall unit is operated by 110 volt alternating current the current comes in through the contacts 121a and 121b. The resistor 371 with its resistance of 30 ohms protects the selenium rectifier 375 from being burned out if any short circuit has occurred in the wave wall unit. The alternating current in passing through the rectifier 375 is converted to a direct current.

From here on the description of the operation of the wave wall unit of the trap is the same as heretofore described, omitting that part of the description that is special to the operation of the wave wall unit by 6-volts.

The outside dimensions of this trap are substantially as follows:

29 inches long, 22 inches wide and 19 inches high. It has two covers that are hinged, each being 29 inches long and 11 inches wide, the hinges being attached on the edge 29 inches long.

I claim:

1. In an animal trap, the combination of a runway open at both ends, a sliding door at each end of the runway adapted to drop and close the ends of the runway, a partition at the side of the runway having an opening therein, a sliding door adapted to close the opening, a ramp leading from said opening on the far side of the partition, an upper deck to which said ramp leads, a hinged trap door forming part of said upper deck, a door adapted to slide upwardly between the hinged door and the rest of the upper deck, means for releasing the first and second doors at the same time to thereby close the runway, means for thereafter releasing the third door, the three doors dropping by gravity and closing the openings adjacent thereto, means for releasing and raising the fourth door to separate the hinged door from the balance of the deck, means for releasing the hinged door and permitting it to drop, means for returning all of the doors to their original position, and means for holding said doors in their original position.

2. In an animal trap, the combination of a runway open at both ends, a sliding door at each end of the runway adapted to drop and close the ends of the runway, a partition at the side of the runway having an opening therein, a sliding door adapted to close the opening, a ramp leading from said opening on the far side of the partition, an upper deck to which said ramp leads, a hinged trap door forming part of said upper deck, a door adapted to slide upwardly between the hinged door and the rest of the upper deck, means for releasing the first and second doors at the same time to thereby close the runway, means for thereafter releasing the third door, the three doors dropping by gravity and closing the openings adjacent thereto, means for releasing and raising the fourth door to separate the hinged door from the balance of the deck, means for releasing the hinged door and permitting it to drop, an electric motor, means for starting the motor on the movement of one of the doors, means operated by the motor for returning all of the doors to their original position, means for holding said doors in their original position, and means for then stopping the operation of the motor.

3. In an animal trap, the combination of a runway open at both ends, a sliding door at each end of the runway adapted to drop and close the ends of the runway, a partition at the side of the runway having an opening therein, a sliding door adapted to close the opening, a ramp leading from said opening on the far side of the partition, an upper deck to which said ramp leads, a hinged trap door forming part of said upper deck, a door adapted to slide upwardly between the hinged door and the rest of the upper deck, means for releasing the first and second doors at the same time to thereby close the runway, means for thereafter releasing the third door, the three doors dropping by gravity thereby close the openings adjacent thereto, means for releasing and raising the fourth door to separate the hinged door from the balance of the deck, means for releasing the hinged door and permitting it to drop, an electric motor, means for starting the motor on the movement of one of the doors, means operated by the motor for returning all of the doors to their original position, means for holding said doors in their original position, and means for then stopping the operation of the door.

4. In a rat trap a runway, a sliding door at each end of the runway, adapted to close the runway, a pair of levers, oppositely disposed, mounted on parallel pivots over the runway, the outer ends of said levers engaging said doors, and a cam adapted to rotate and thereby push the inner ends of said levers down and raise the outer ends of said levers and raise the doors.

5. In a rat trap a runway, a sliding door at each end of the runway adapted to close the runway, a pair of levers of the first class oppositely disposed and mounted on parallel pivots, the outer ends of said levers engaging said doors, a rotatable cam placed over the runway and adapted to push down the inner ends of said levers and raise the outer ends of said levers and the doors, and a guideway under the cam for guiding the inner ends of said levers.

EDWARD W. SCHULZ.

REFERENCES CITED

The following references are of record in the file of this patent:

UNITED STATES PATENTS

| Number | Name | Date |
|---|---|---|
| 909,814 | Norris | Jan. 12, 1906 |
| 1,960,020 | McGall | May 22, 1934 |
| 2,106,054 | Leighton | Jan. 18, 1938 |
| 2,115,162 | Garstang | Apr. 26, 1938 |
| 2,247,931 | Vincent et al. | July 1, 1941 |
| 2,411,766 | Vincent et al. | Nov. 26, 1946 |